(12) United States Patent
Girimonte et al.

(10) Patent No.: US 12,077,334 B2
(45) Date of Patent: Sep. 3, 2024

(54) TRAY FOR SOFT MATERIALS AND METHODS OF LOADING TRAYS WITH SOFT MATERIALS

(71) Applicant: MEATY MEATS INC., Mississauga (CA)

(72) Inventors: Vincent Girimonte, Mississauga (CA); Alessandro Girimonte, Mississauga (CA)

(73) Assignee: MEATY MEATS INC., Mississauga (CA)

( * ) Notice: Subject to any disclaimer, the term of this patent is extended or adjusted under 35 U.S.C. 154(b) by 0 days.

(21) Appl. No.: 18/489,711

(22) Filed: Oct. 18, 2023

(65) Prior Publication Data
US 2024/0043156 A1 Feb. 8, 2024

Related U.S. Application Data

(63) Continuation of application No. 17/599,386, filed as application No. PCT/CA2020/050414 on Mar. 30, 2020.

(60) Provisional application No. 62/825,376, filed on Mar. 28, 2019.

(51) Int. Cl.
| | |
|---|---|
| B65B 57/16 | (2006.01) |
| B65B 5/10 | (2006.01) |
| B65B 7/16 | (2006.01) |
| B65B 7/28 | (2006.01) |
| B65B 19/34 | (2006.01) |
| B65B 31/02 | (2006.01) |
| B65B 35/32 | (2006.01) |
| B65B 35/46 | (2006.01) |

(52) U.S. Cl.
CPC .............. *B65B 57/16* (2013.01); *B65B 5/101* (2013.01); *B65B 7/165* (2013.01); *B65B 7/285* (2013.01); *B65B 19/34* (2013.01); *B65B 31/028* (2013.01); *B65B 35/32* (2013.01); *B65B 35/46* (2013.01)

(58) Field of Classification Search
None
See application file for complete search history.

(56) References Cited

U.S. PATENT DOCUMENTS

| | | | |
|---|---|---|---|
| 2,816,038 A | 12/1957 | Thommen | |
| 3,683,793 A | 8/1972 | Garnett | |
| 4,009,817 A | 3/1977 | Marshall et al. | |
| 4,633,652 A * | 1/1987 | Dagenais | B65B 19/34 53/448 |

(Continued)

FOREIGN PATENT DOCUMENTS

| | | |
|---|---|---|
| DE | 20214487 U1 | 3/2003 |
| JP | 2016145071 A | 8/2016 |

(Continued)

*Primary Examiner* — Tanzim Imam
(74) *Attorney, Agent, or Firm* — Norton Rose Fulbright Canada LLP

(57) ABSTRACT

A tray for receiving sausages is provided. The tray includes cells which are adapted to substantially match the shape of sausages or other soft materials. The tray may be vacuum sealed to cause a relatively uniform top surface suitable for stacking. The tray may be sealed without pre-freezing the sausages and without causing significant deformation to said sausages upon thawing. The tray may be loaded in an automated manner without the use of robotic arms placing individual sausages into the tray.

15 Claims, 20 Drawing Sheets

(56) References Cited

U.S. PATENT DOCUMENTS

| | | | |
|---|---|---|---|
| 4,682,387 A | | 7/1987 | Leining |
| 5,203,142 A | | 4/1993 | Kollross |
| 5,269,116 A | | 12/1993 | Roberts et al. |
| 6,141,943 A | | 11/2000 | Hart et al. |
| 7,154,073 B2 | | 12/2006 | Iwai et al. |
| 7,220,176 B2 | | 5/2007 | Hartwick |
| 9,504,263 B2 | * | 11/2016 | Meggelaars ............ B65G 47/53 |
| 2005/0279802 A1 | | 12/2005 | Moeller |
| 2007/0045083 A1 | | 3/2007 | Hart et al. |
| 2010/0230322 A1 | * | 9/2010 | Nicholson ................ B65D 1/34 |
| | | | 206/557 |
| 2012/0292226 A1 | * | 11/2012 | Hilbish ................... B65D 1/34 |
| | | | 156/224 |
| 2018/0206510 A1 | * | 7/2018 | Greif ........................ B65B 5/10 |
| 2018/0215529 A1 | * | 8/2018 | Bergeron ............... B65B 19/34 |

FOREIGN PATENT DOCUMENTS

| | | |
|---|---|---|
| KR | 200410098 Y1 | 3/2006 |
| WO | 0194208 A1 | 12/2001 |
| WO | 2008065807 A1 | 6/2008 |
| WO | 2011062754 A1 | 5/2011 |
| WO | 2017018531 A1 | 2/2017 |

\* cited by examiner

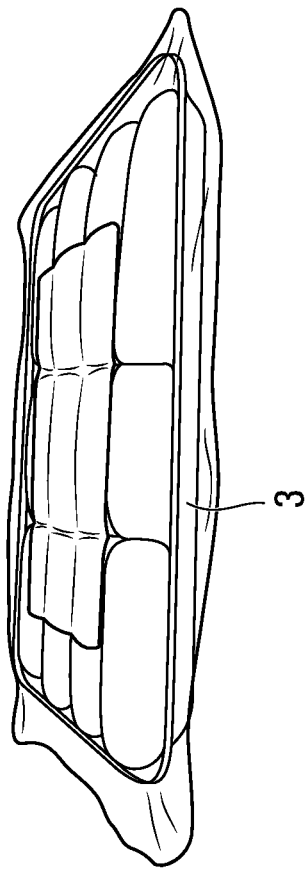
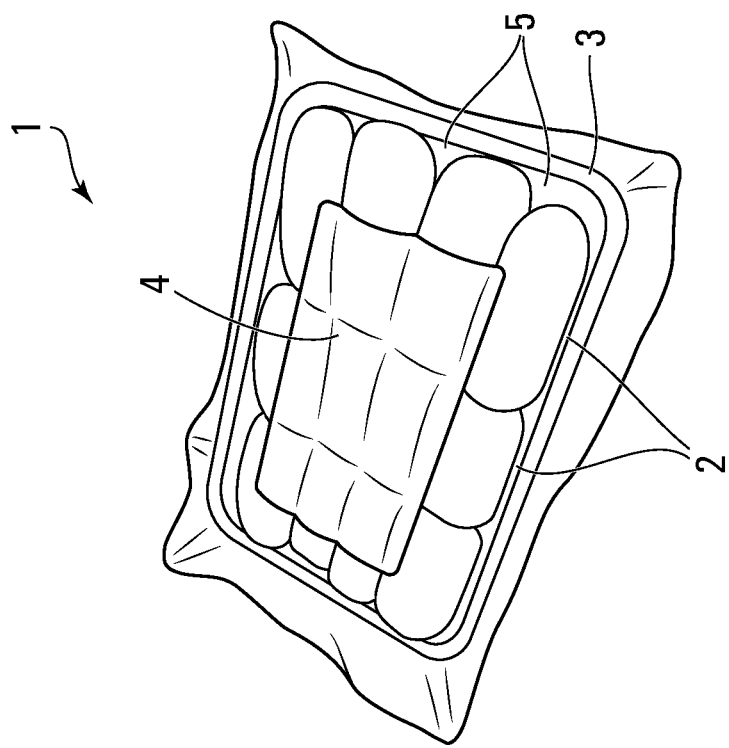
FIG. 1B
Prior Art
FIG. 1A
Prior Art

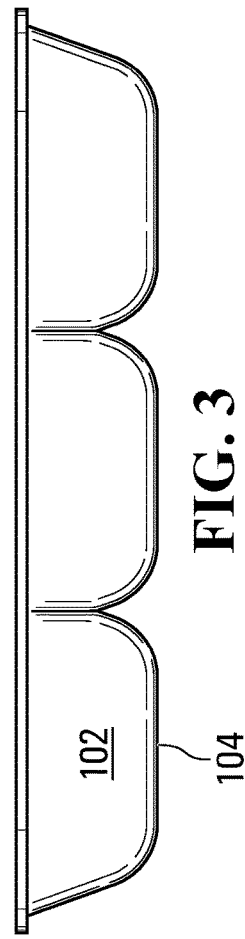
FIG. 4
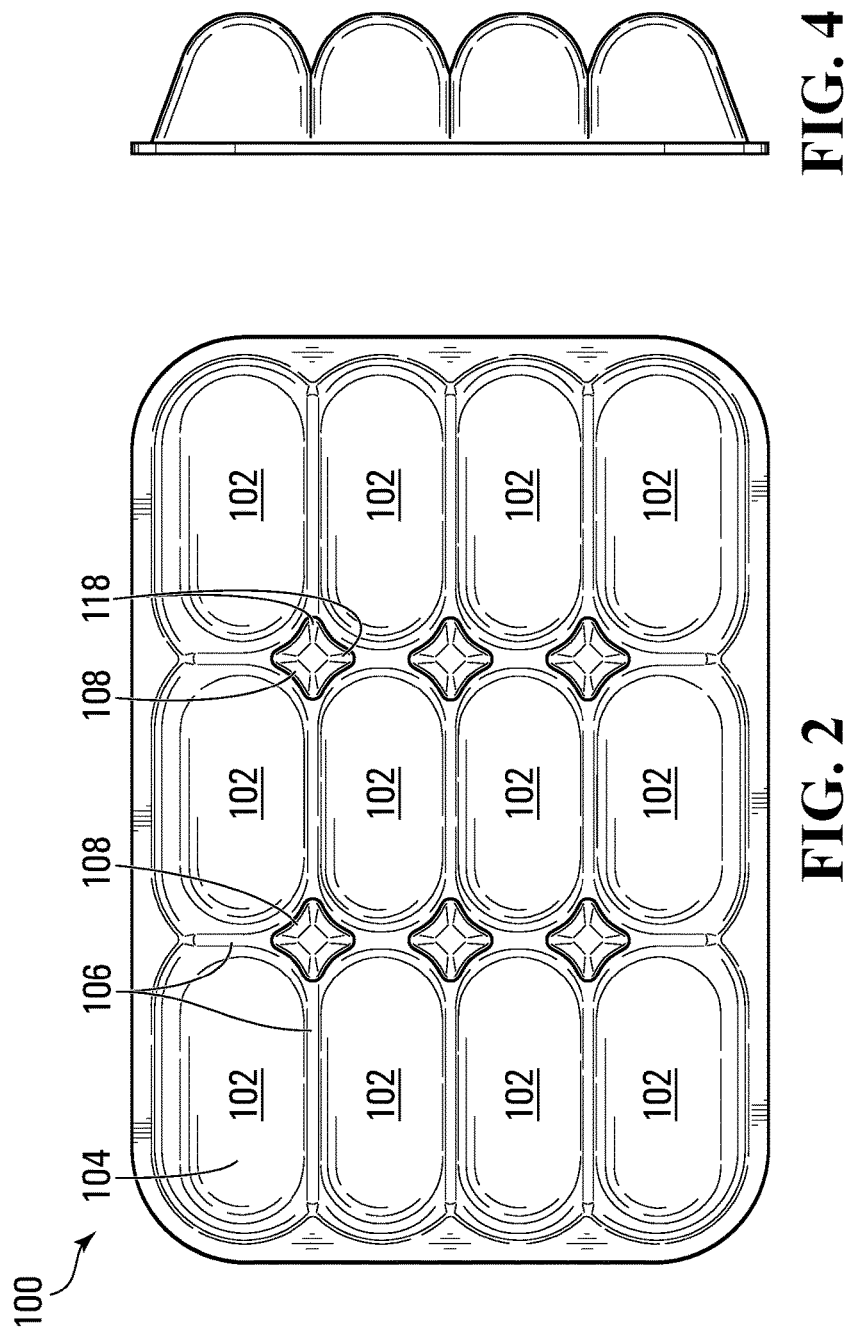
FIG. 2
FIG. 3

TRAY FOR SOFT MATERIALS AND METHODS OF LOADING TRAYS WITH SOFT MATERIALS

CROSS-REFERENCE TO RELATED APPLICATIONS

This is a continuation stemming from U.S. patent application Ser. No. 17/599,386, which is a U.S. national phase entry under 35 USC 371 of PCT Application No. PCT/CA2020/050414, filed Mar. 30, 2020, which claims priority to U.S. Provisional Patent Application No. 62/825,376, filed Mar. 28, 2019, the entire contents of each of the above-noted applications being incorporated herein by reference.

FIELD

This relates to trays for soft solid materials, such as fresh meats, and to sealed arrangements containing said trays and methods of loading said trays.

BACKGROUND

Currently, soft materials, such as fresh meats (e.g. sausages), are typically sold to consumers in various packages. Although this specification refers specifically to sausages, it is to be understood that the embodiments described herein are applicable to other soft meats and soft materials. Containers for meats and other soft materials can generally be divided into two types: modified atmosphere packaging (MAP) and non-modified atmosphere packaging (non-MAP).

Non-MAP packaging may come in many forms (e.g. paper or plastic bags, boxes, or the like). Bags are suitable for small quantities of sausages, but cannot be scaled up to larger quantities of sausages. Stacking paper bags would result in sausages in the lower levels being crushed and/or deformed, and unappetizing at best. Bags may be placed inside a box, which may render them stackable. However, non-MAP packaging generally suffers from a reduced shelf life due to the presence of spoilage bacteria, increased risk of freezer burn, and other quality issues such as frosting. As such, at the retail level, non-MAP packaging is typically not used.

Another method of packaging sausages is first placing sausages on a tray with high vertical walls and then sealing the top of the tray. However, the trays are shaped to have sidewalls which are vertically taller than the sausages being packaged (so as to avoid the issue with crushing the sausages). This results in unused space (e.g. "headspace") within the packaged tray, easily punctured seals, increased customer returns, etc. Moreover, frost can easily form within a sealed package, negatively affecting the meats stored within. Gas flushing tray sealed packages with carbon dioxide or nitrogen may aid with preventing frost build-up, but may also affect the quality of the sausages stored within the sealed package.

Another method of packaging sausages is placing sausages on a flat tray and performing a vacuum sealing process using, for example, a plastic sealing pouch or skin pack. In so doing, sausages can be packed more tightly, thus saving space, and in an air-tight manner, with relatively gentle packaging. However, soft materials such as sausages are nevertheless easily deformed. As such, the vacuum sealing process may cause the sausages to be crushed and/or deformed as the air is removed from the package. Moreover, vacuum sealing may require specialized trays and films, as film is required to bond with the tray or bottom medium. Such vacuum sealing systems are also difficult to customize, and are associated with high costs, as machines are more complicated to service and expensive to purchase. Moreover, production speed and/or capacity may be reduced by as much as a factor of two.

An example of MAP packaging is vacuum sealing. Sausages or other soft materials may be placed in a chamber, and then air is removed from the chamber using a pump until the desired pressure inside the packages is reached, at which point the packages are sealed, normally by fusing the packaging material together with heat. However, vacuum sealing may cause soft materials to deform and squish as the pressure within the package is reduced, which may damage soft materials such as sausages.

One method for alleviating this problem is to freeze or at least partially freeze sausages prior to packaging them. For example, sausages can be frozen or partially frozen in advance of packaging, and then frozen or partially frozen, more rigid sausages can be placed on a flat tray to be sealed. The cylindrical shape of the frozen, rigid sausages may be more closely preserved during vacuum sealing to avoid crushing (see, for example, FIGS. 1A, 1B, 1C and 1D).

However, the pre-freezing process is energy-intensive, and takes a substantial amount of time before sausages are adequately frozen to be vacuum sealed with reduced deformation. In some cases, the additional costs associated with pre-freezing sausages may be substantially higher, including potentially more than double the handling and storage costs. Moreover, the frozen, packaged sausages have to be kept frozen. That is, they must be transported in trucks with reefer units, which represents further expenditures of energy, and must be kept frozen at retailers. Further, when presented on display at retailers, these packages tend to have a non-uniform, irregular shape as it may be impossible or very difficult to retain an exact shape for each piece. This is not aesthetically pleasing to customers, and conveys a fairly disorganized and shabby level of quality.

As can be seen particularly in FIG. 1B, the frozen sausages 2 in package 1 are quite bulbous, and the resulting top surface of the package 1 is uneven, with many undulations and ridges. As such, applying a label 4 to the package is cumbersome, since the surface is not close to being flat. Moreover, if a consumer wishes to purchase multiple packages 1, the packages 1 do not stack easily, because the flat tray 3 does not have any stability when placed on top of the uneven top surface of another package. Thus, the customer experience is somewhat "messy" when using package 1. Moreover, the appearance of such packages may be easily imitated by competitors, and so very little brand distinctiveness can be achieved using such packages.

In addition, it may be impossible or extremely difficult to achieve a perfect seal between the frozen sausages and the wrapping material. As can be seen in FIG. 1A, there are many areas in which there are air pockets 5. These air pockets 5 allow frost to form on the sausages, which negatively impacts the quality of the sausage. This may also negatively impact the shelf life of the sausages. Frost may also build up to such an extent that a customer's view of the sausage may be obstructed by the frost in a retail setting. Moreover, when the sausages are finally thawed by the end user for consumption, they may still be somewhat deformed, which may be unappetizing for consumers, and can be bothersome to consumers who place value on the "presentation" of foods.

Further, as a consequence of the requirement to freeze sausages, it is difficult or impossible to ship fresh sausages to customers (e.g. on the same day the sausages are made), because the freezing and packaging processes take too much time. This implies that sausage manufacturers located away from urban centres are at a competitive disadvantage to local butchers (who may be able to deliver small quantities locally through less efficient packaging means).

In addition, the loading of known tray 3 with sausages 2 is quite cumbersome. Sausages must be loaded manually onto tray 3, and in a fairly haphazard manner, which is labour intensive and inefficient.

There is a need for systems and processes which reduce or eliminate one or more of the above-noted disadvantages associated with present systems.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to an aspect, there is provided an arrangement for storing fresh meat articles, the arrangement comprising: a first tray comprising: a plurality of cells, each cell including a seat and one or more ribs defining the shape of said respective cell, said seat and ribs being configured to substantially match a shape of said fresh meat article; a plurality of base support columns protruding vertically upward at intersections of one or more ribs; a sealing pouch adapted to be vacuum sealed around said tray and said one or more fresh meat articles, said sealing pouch being configured to temporarily deform at least a portion of said fresh meat articles into a substantially smooth upper surface.

According to another aspect, there is provided a method of loading a tray with fresh meat articles, the method comprising: propelling, at a first speed on a first conveyor line, at least one fresh meat article towards a tray having a plurality of cells for receiving the at least one fresh meat article, the tray sitting on a second conveyor line oriented at an angle to a direction of the at least one fresh meat article; detecting, by a sensing device, presence of the at least one fresh meat article on the first conveyor line; determining, by a processor, a second speed for moving the second conveyor line to accept a subsequent one of said fresh meat articles; and moving, by the second conveyor line, the tray by an increment.

Other features will become apparent from the drawings in conjunction with the following description.

BRIEF DESCRIPTION OF DRAWINGS

In the following figures, dimensions of components are chosen for convenience and clarity only and are not necessarily shown to scale. Embodiments of the invention will now be described in greater detail with reference to the accompanying figures, in which:

FIG. 1A is a perspective view of a tray for sausages;
FIG. 1B is a side-oriented view of the tray of FIG. 1A;
FIG. 2 is a top view of a tray for sausages according to some embodiments;
FIG. 3 is a side view of the tray of FIG. 2;
FIG. 4 is a front view of the tray of FIG. 2.

DETAILED DESCRIPTION

Figure 1D:
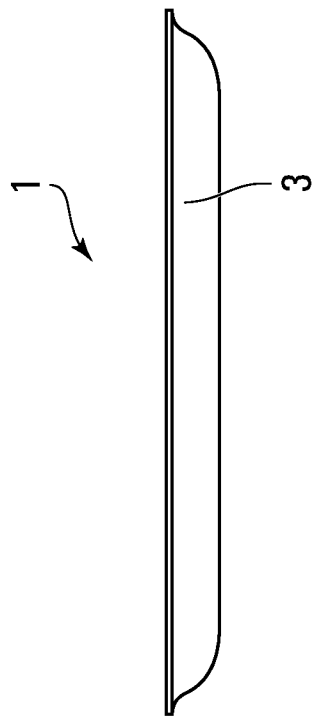
FIG. 1D is a side view of the tray of FIG. 1C.
Figure 1C:
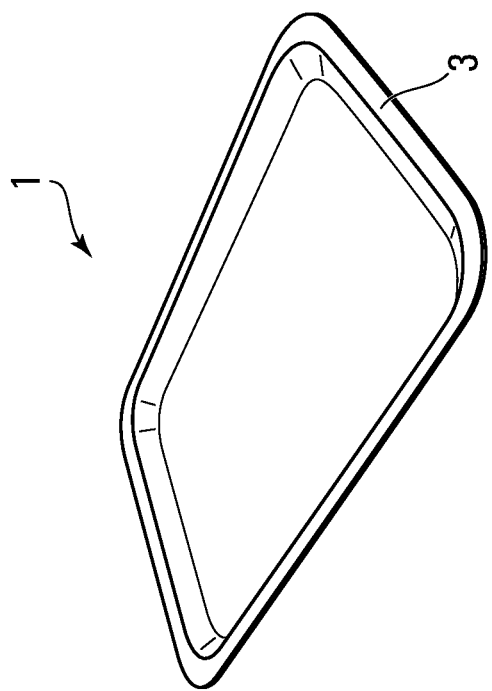
FIG. 1C is a perspective view of the tray of FIG. 1A when unloaded.

Various embodiments illustrate a tray for stacking, transporting, displaying, and selling packages filled with sausages and other soft materials. Though the following description makes frequent reference to "sausages" in connection with one or more embodiments, it should be appreciated that embodiments could also or instead be used in association with other soft materials, such as other meats, soft cheeses, and/or breads.

FIGS. 2-6 are views of an example embodiment of a stackable tray for sausages in accordance with one embodiment. In some configurations, the tray is shown with sausages filling one more portions, and in some configurations the tray is shown without sausages filling any portions. In some configurations, one or more trays are stacked, and in some configurations one or more trays are nested. It should be appreciated that the embodiments shown in FIGS. 2 to 6 are intended solely for illustrative purposes, and that the present invention is in no way limited to the particular example embodiments explicitly shown in the drawings and described herein.

Referring to FIG. 2, tray 100 comprises a tray body comprising an outer top surface 112 provided with an array of one or more recessed cells 102 for receiving sausages. Each cell 102 may comprise a seat 104 and reinforcement ribs 106 which may surround the seat 104. The tray 100 may further include base support columns 108, which culminate in a top surface 110. The base support columns 108 are generally formed at intersections of reinforcement ribs 106. The cell 102 may be shaped to receive one or more sausages. Though cell 102 is depicted as having a substantially semi-cylindrical shape, this is not essential as other shapes may be employed. Moreover, the tray 100 can be configured and dimensioned differently so as to accommodate different sausage shapes and sizes, and/or a different number of sausages than the 12 cells 102 shown in FIGS. 2 to 6.

Figure 5:
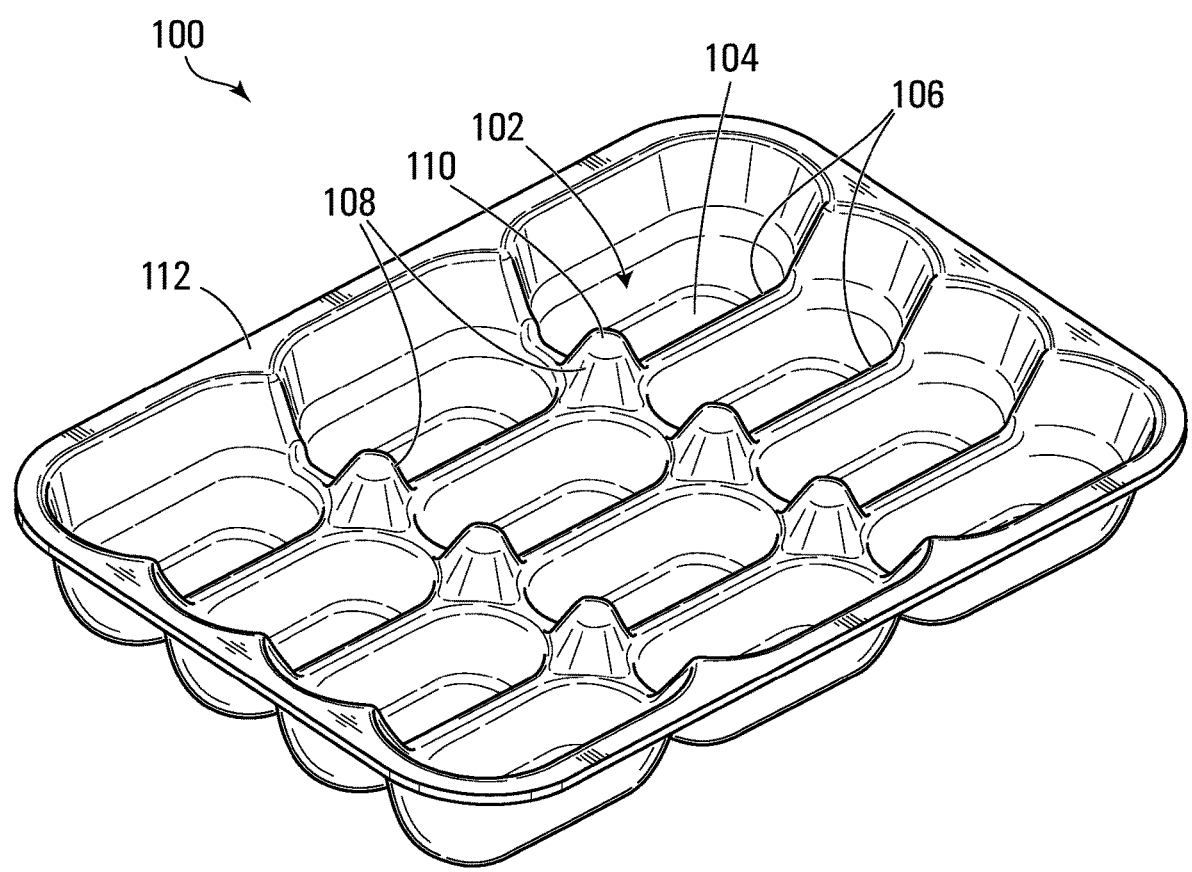
FIG. 5 is a perspective view of the tray of FIG. 2.

As depicted in FIG. 5, the vertical height of the reinforcement ribs 106 may be vertically lower than the height of the outer top surface 112. In some embodiments, the top surface 110 is substantially horizontal and flat. In some embodiments, the height of the top surface 110 is substantially similar to the height of the outer top surface 112. In some embodiments, the height of the top surface 110 is vertically lower than the height of the outer top surface 112.

The shape employed for cell 102 is dictated by the shape and size of the product (i.e. sausage or other soft material) to be accommodated, so as to effectively utilize space on tray 100 while maintaining structural integrity and functionality of the tray 100. Sausages are normally substantially cylindrical in shape and manufactured in "links". In some embodiments, the longitudinal length of cell 102 may be substantially equal to the length of a sausage, such that a sausage may lay flat across the cell 102 on its side (see, e.g., FIG. 7). In some embodiments (not shown), the seat 104 may be configured to receive two or more sausage placed alongside one another. In some embodiments, the seat 104 is contoured so as to accommodate a single sausage without warping the shape of the sausage.

Figure 7:
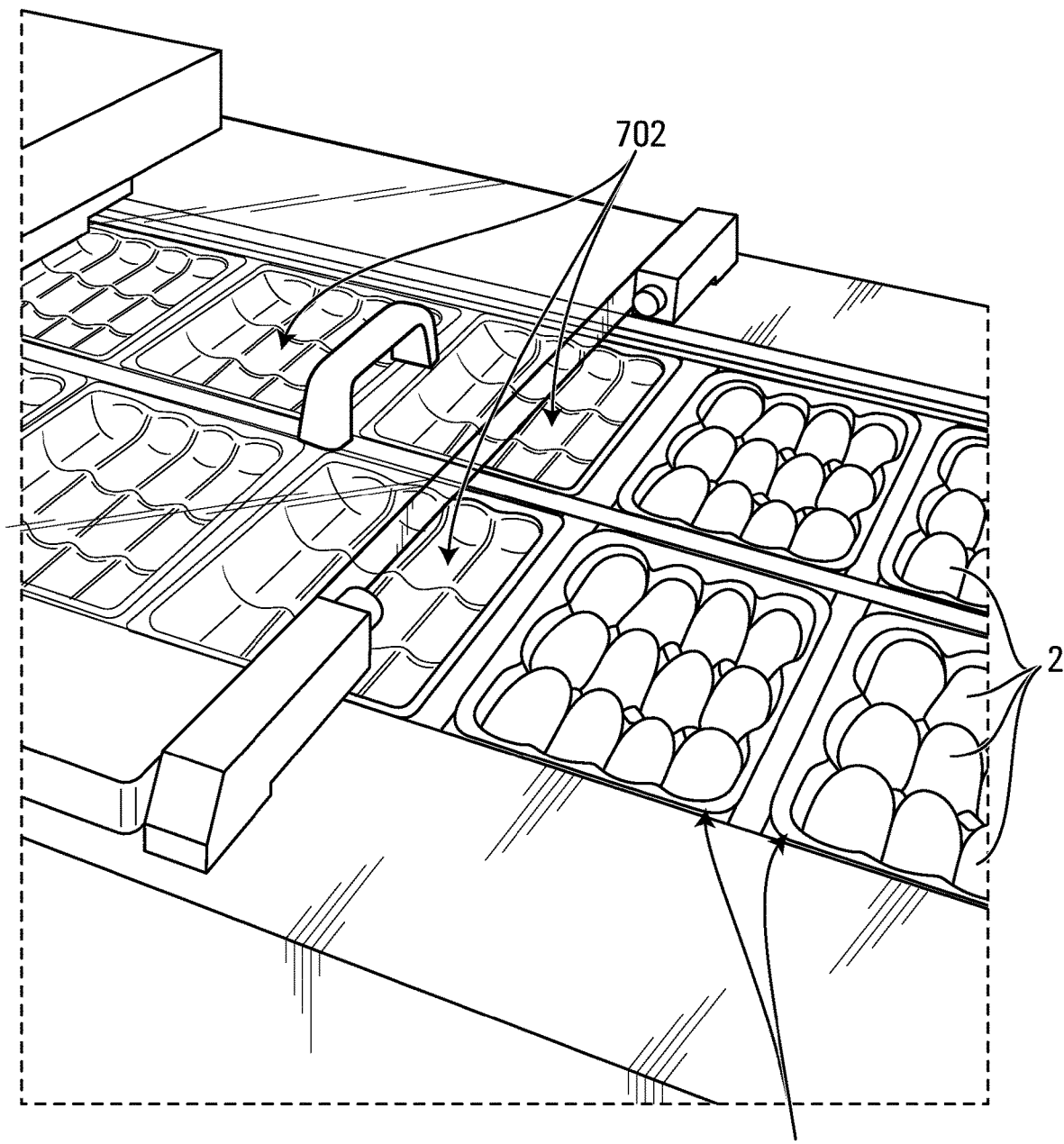
FIG. 7 is a perspective view of the tray of FIG. 2 when loaded with a plurality of sausages prior to sealing.

It will be appreciated that in embodiments in which the shape of cell 102 substantially matches or is substantially complementary to the shape of a lower half of a sausage, there is minimal risk of permanent deformation on the underside of the sausage, and pre-freezing the sausages prior to placing them in the cell 102 of tray 100 is unnecessary. As shown in FIG. 7, the sausages may be placed into tray 100 fresh, without any pre-freezing step. As such, the pre-freezing stage of the conventional sausage packaging process may be bypassed, thus saving both time and energy, when sausages are stored in the tray 100.

Both the stability of the tray and the degree to which sausages may be deformed while resting in the tray 100 may be enhanced when the cells 102 have a shape which is complementary to the shape of the sausages. This can assist with both lateral stability and axial stability in keeping stacked trays aligned.

Reinforcement ribs 106 may surround the seat 104 and may be shaped and sized to provide rigidity and stability to the tray 100. The base support columns 108 may also provide structural, mechanical and functional support to tray 100 to prevent the tray 100 from warping or buckling, and to distribute surface tension from any wrapping material used for vacuum packing, as described in further detail below, to aid in avoiding excess forces being applied to the sausages to avoid deformation of the sausages.

Figure 6:
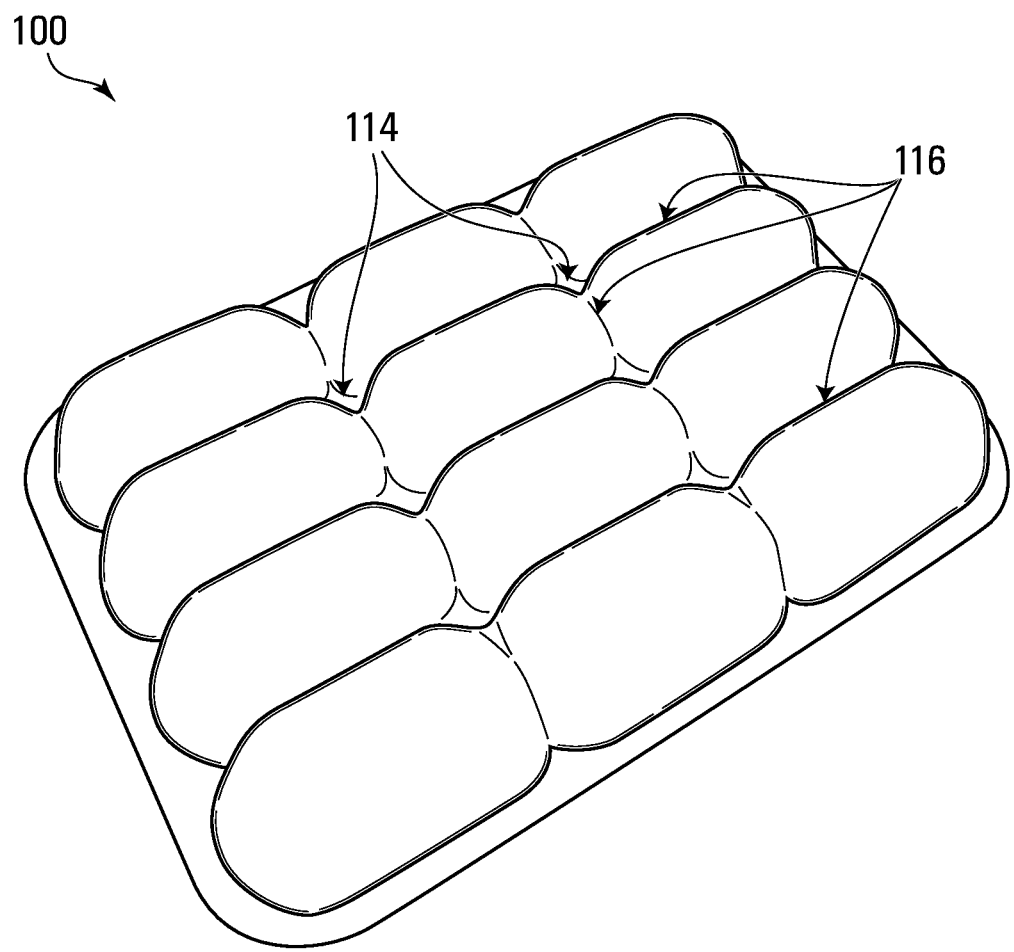
FIG. 6 is a photograph of the underside of the tray of FIG. 2.

The base support columns 108 may be arranged to protrude upwardly from areas between adjacent cells 102. The base support columns may be either vertically protruding, or protruding with a varying slope or slant. As shown in FIG. 6, the underside of the tray 100 may include receptors 114 which are complementary in shape to the base support columns 108, and any teeth 118 on top surface 110, as well as rib grooves 116. This relationship allows for convenient nesting of multiple unloaded trays. In some embodiments, the top surface 110 is smooth and does not include teeth 118, and the underside of the tray does not include receptors complementary in shape to teeth 118 (as depicted in FIG. 6).

Base support columns 108 may be integral with reinforcement ribs 106 and/or seat 104, but may also be separable from the tray 100. The base support columns, if not formed integrally with tray 100, may be made of a different material than tray 100. The shape of base support columns 108 may be wider at the lower end and become increasingly narrow towards top surface 110. The base support columns 108 may also be hollow so as to allow for nesting of a first tray with another tray above or below the first tray. Base support columns 108 may also, when trays are nested, prevent lateral movement of the trays. Different base support columns 108 on tray 100 may be different shapes and/or heights. In some embodiments, each base support column 108 has the same shape and height.

Top surface 110 may have any suitable texture or shape. In some embodiments, top surface 110 comprises one or more teeth 118 which have a shape complementary with tooth receptors on the underside receptors 114 of tray 100. In some embodiments, the teeth 118 on a first empty tray 100 may, when nested with a second tray 100, fit into tooth receptors on the second tray and provide a friction fit.

As shown in FIG. 2, more than one cell 102 may be provided. Specifically, the outer top surface 112 may include two or more cells 102 (FIG. 4 depicts 12 cells 102), which may be substantially the same size or may differ at least in size. For example, tray 100 may be provided with an array of cells 102 which differ in size from one another. For example, one cell 102 may be dimensioned to fit two sausages, while another cell 102 may be dimensioned to fit one sausage.

The tray 100 may be made of a single material (e.g. plastic), and in particular may be made from a variety of processes (e.g. injection molding, compression molding, thermoforming, or the like). Plastics may include any known variants of polyethylene or polystyrene, as well as metals, papers, or combinations thereof. The tray 100 may also be made from a composite of separate materials joined together. In some embodiments, the tray 100 is a plastic molding in which the top surface and bottom surface are complementary surfaces (i.e. receptors 114 are the underside of base support columns 108, rib grooves 116 are the underside of reinforcement ribs 106, and the like). It will be understood that in embodiments in which different base support columns 108 have different shapes (e.g. cross-sectional shape, height, and/or width), in order to achieve optimal nesting capabilities, trays 100 used for nesting should have similar or identical dimensions. In some embodiments, tray 100 may be made of a recyclable or compostable tray material.

As noted above, and as depicted in FIG. 7, the cells in tray 100 are dimensioned and shaped to receive soft food items (e.g. sausages). FIG. 7 is a perspective photo of a tray 100 which has been loaded with sausages. As can be seen, the sausages fit into each individual cell. Because fresh sausages are soft and deformable, the cells 102 can accommodate sausages with varying shapes and dimensions (that is—the tray 100 can accommodate some variation in the size of each individual sausage, without requiring all sausages to be identical). The sausages in FIG. 7 are fresh sausages and are not frozen. Tray 100 can be loaded with fresh sausages without any pre-freezing step. Moreover, the dimensions and shape of tray 100 may allow for novel and inventive methods of loading fresh sausages into tray 100. As noted above with respect to known tray 1, sausages are required to be loaded manually. Tray 100 facilitates more efficient methods and processes for loading tray 100 with fresh sausages.

Figure 8A:
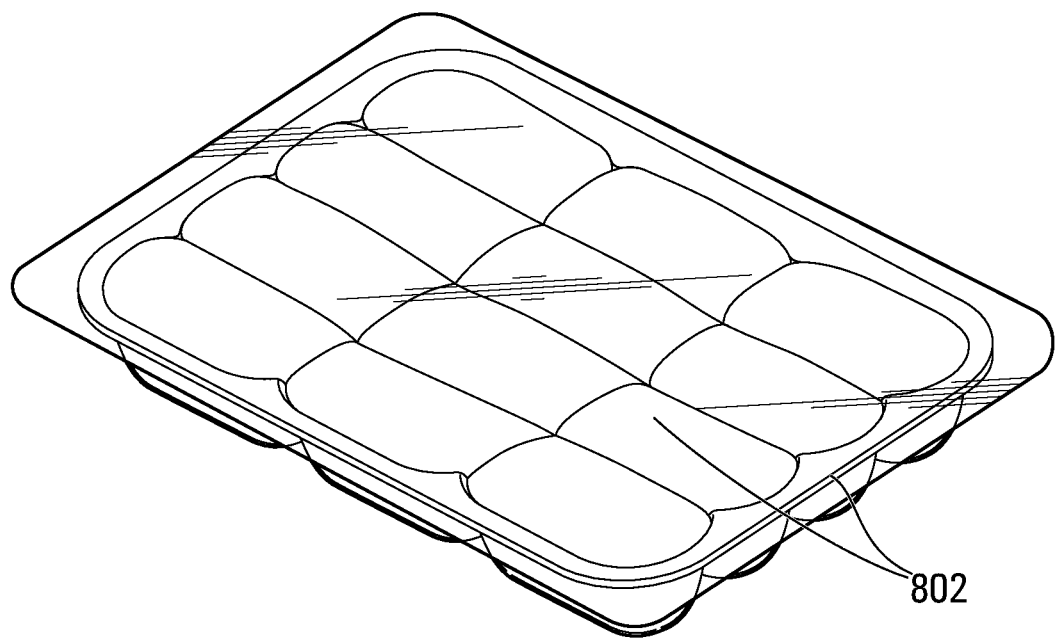
FIG. 8A is a perspective view of the tray of FIG. 2 when loaded with a plurality of sausages and vacuum sealed.
Figure 8B:
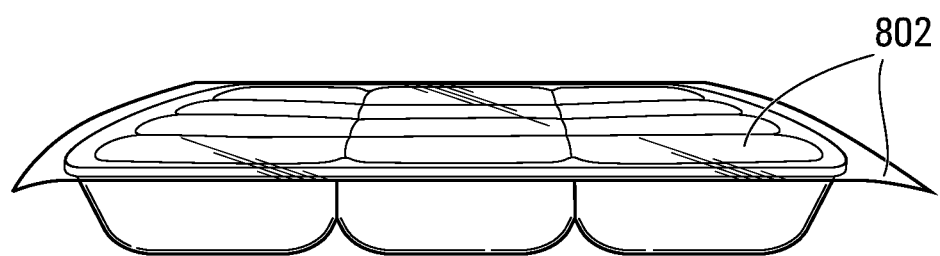
FIG. 8B is a side-oriented view of the tray of FIG. 8A.

After loading tray 100 with fresh sausages, the tray 100 may be sealed. As shown in FIG. 7, adjacent to the tray 100 is a plastic pouch 702 which may be formed around tray 100. In some embodiments, the pouch 702 may be bonded and sealed to tray 100. It will be appreciated that the bottom side of the pouch 702 has a form which is substantially similar to the underside of tray 100. The bottom side of the pouch 702 is placed around the underside of tray 100 and may be subsequently sealed to another roll of plastic film along the top of the tray to form the top side of the pouch. The sealing process may be, for example, a thermal sealing process in which air is vacuumed out of the pouch and the pouch 702 bonds to the upper surface 112 of tray 100. In some embodiments, vacuum sealing places approximately 1000 millibars or 14.5 psi of pressure on the sausages. This may be carried out using thermoforming machines, such as those manufactured by VC999, Multivac, Ultravac, and Technovac. FIGS. 8A and 8B illustrate a sealed pouch 702 which contains tray 100 loaded with sausages.

It will be appreciated that it is theoretically possible to simply place sausages directly in pouch 702, without using tray 100, and then to vacuum seal the pouch 702. In fact, during development of the present invention, the inventors were advised that there was no need for a tray 100, and that the concept of using a tray 100 within pouch 702 would be redundant and a waste of material, given that sausages could be placed directly into pouch 702 rather than using a tray. However, the inventors found that the use of tray 100 resulted in numerous unexpected advantages, which are described herein.

FIG. 8A is a perspective view of a sealed arrangement 800 including tray 100 loaded with sausages. The sealed arrangement 800 may result from applying the pouch 702 to the loaded tray 100 in FIG. 7 and vacuum sealing the pouch around the tray 100. It will be appreciated that the upper surface 802 of the sealed arrangement 800 is substantially flat. Contrastingly, it will be appreciated that in FIG. 7, each fresh sausage 2 is somewhat bulbous and protrudes from the cell 102 of tray 100 in which the sausage 2 is stored, and there is ample spacing between individual fresh sausages 2.

When vacuum sealing is applied to the pouch 702, the pouch tightens around the top surface 112 and the underside of tray 100. In so doing, the fresh sausages 2 are compressed. In some embodiments, the effect of this compression on the sausages 2 is a substantially continuous upper surface 802 with substantially no open space between sausages. As shown in FIGS. 8A and 8B, the fresh sausages are capable of deforming under the pressure of vacuum sealing to fill any space which remains between tray 100 and upper surface 802 of the pouch 702. This upper surface offers numerous unexpected advantages over other tray designs, including providing an area for attaching a label or other ticket, as the accuracy of label adhesion and application may be improved with a smoother upper surface 802. This may facilitate product differentiation.

It should be noted that the above-noted vacuum sealing process can be conducted using fresh sausages. As noted above, prior trays required the sausages to be frozen or partially frozen prior to vacuum sealing the tray. With prior trays, any attempt to vacuum seal fresh sausages would result in the sausages squirting out of the tray, or being crushed by the sealing to the extent that the sausages could not regain their regular shape after removal from the tray.

Contrastingly, in some embodiments, the tray 100 allows for the pre-freezing step to be avoided. This represents a substantial improvement in efficiency and in the possibilities for selling fresh sausages. For example, the time required to pre-freeze the sausages to a desired level of rigidity may be avoided using tray 100, thus reducing the length of production cycles. Moreover, inventory costs may be reduced by reducing the need for freezer space required by the pre-freezing step. This may also allow sausage producers to produce and package fresh sausages for sale on the same day, rather than having to freeze sausages and then sell the sausages from frozen the following day. Further, as described below, the tray 100 may be easier to load with sausages. For example, tray 100 can be loaded with sausages via non-robotic means, which might not be possible with conventional flat trays.

Moreover, when the arrangement 800 is subsequently opened (e.g. by a consumer) after the vacuum sealing, the sausages 2 are sufficiently resilient to substantially regain their original shape. That is, the sausages can regain their original shape with little or substantially no permanent deformation. In some embodiments, the sausages may regain from ⅞ of their original shape to a full regaining of the original sausage shape. This would not be possible with previous tray designs—which result in the sausages being deformed and disfigured, and thus less attractive to the end user. The cells 102 in tray 100 are dimensioned so as to substantially maintain the original cylindrical shape of the sausages 2 prior to freezing. Contrastingly, a flat tray would not provide any support for maintaining the shape of the fresh sausage.

As a further advantage, it should be appreciated that the sealed arrangement 800 includes substantially no air pockets between sausages. Relative to the tray in FIGS. 1A and 1B (which contains numerous air pockets 5 when sealed), the tray 100 may allow for more efficient packing of sausages. Moreover, should the sealed arrangement 800 be subsequently frozen after sealing (e.g. for longer term storage and/or transportation to commercial selling locations), the reduction in air pockets may also reduce the likelihood of frost or "freezer-burn" occurring within the package, thus improving the quality of the sausages 2 when ultimately consumed by the end user.

Using at least two trays 100 it may be possible to create a stacked arrangement of loaded trays, where a first cell 102 of a first tray 100 receives a sausage. Normally, all cells 102 in a first tray would be occupied by sausages and vacuum sealed before a second tray is placed on top of the first loaded, sealed tray. However, it is not strictly necessary for all cells 102 in the first tray 100 to be occupied.

As seen in FIG. 8B, the upper surface 802 of sealed arrangement 800 is fairly flat. In embodiments in which the sausages are fresh, sealed arrangements are easily stacked without the sausages being damaged. For example, the weight of sealed arrangements 800 stacked on top of a base sealed arrangement is dispersed throughout the material used for the upper surface 802, and the sausages cannot deform in any appreciable way under the weight of other trays.

Moreover, in embodiments in which the sealed arrangement is subsequently frozen after sealing, the relatively flat upper surface 802 of sealed arrangement 800 provides a fairly even surface for stacking. While not perfectly flat, sealed arrangements 800 may be stacked with a high degree of stability. It is clear from FIGS. 1A and 1B that the previous tray configurations contained substantial variations in depth and surface contours on the upper surface, because the sausages are pre-frozen to maintain a somewhat cylindrical shape. This variation in upper surface results in fairly clumsy stacking arrangements in view of the flat shape of the underside of the prior tray. It is much easier for a flat try to slide and fall off from an uneven surface in any of a number of directions than it is for a tray with multiple recessed cells. Moreover, stacking multiple levels of the prior trays of FIGS. 1A and 1B results in a compounding of the instability from the stacking of one level of trays. This is an important feature in terms of in-store displays. Consumers tend to be attracted to packaging which is neat and organized, and as such the tray 100 may be more attractive to consumers in a display setting because the trays stack in a stable and organized manner.

Figure 9A:
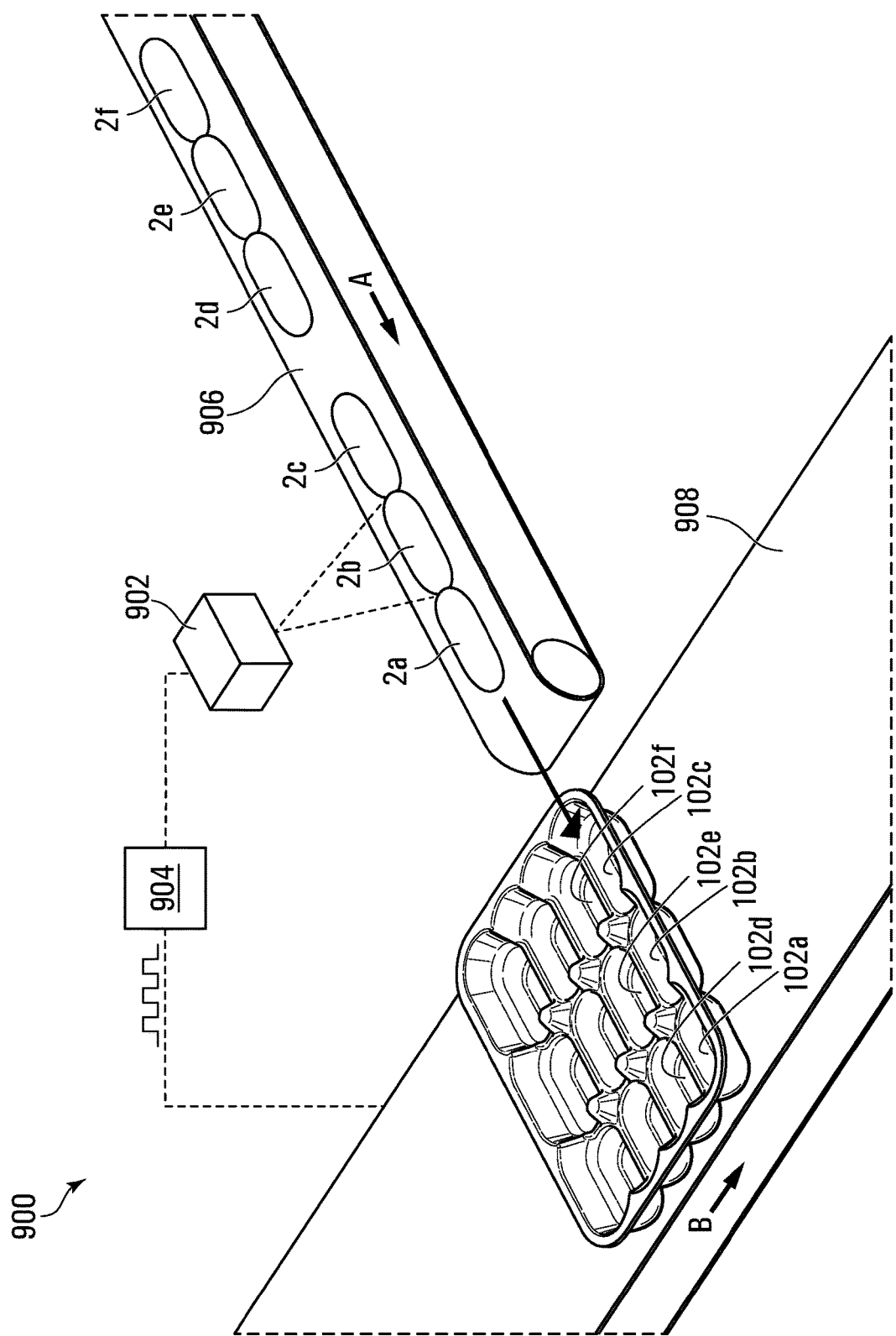
FIG. 9A is a diagram depicting an example process for loading a tray with sausages.

Various embodiments described herein may be used in conjunction with systems and methods for loading a tray with sausages or other soft materials. FIG. 9 is a perspective view depicting an example system for loading tray 100 with fresh sausages. It will be appreciated that the system depicted in FIG. 9 is merely an example and that other variants are contemplated.

As depicted, system 900 includes a processor 904, a sensing device 902, a sausage conveyor 906, and a tray conveyor 908. Sausage conveyor 906 is configured to move sausage links 2a, 2b, 2c and 2d, 2e, 2f in direction A at a predetermined speed. Tray conveyor 908 is configured to move tray 100 in direction B. In some embodiments, the tray conveyor may provide pulsed movement. For example, a motor driving tray conveyor 908 may operate in accordance with a duty cycle (illustrated as a square wave in FIG. 9) calculated and provided by processor 904, meaning the tray is stationary for a period of time, and is then moved for a period of time at a given speed. In some embodiments, there is a jerk or jarring movement associated with the start-and-stop pulsing of a duty cycle.

In operation, the sausage links 2a, 2b and 2c are propelled by sausage conveyor 906 in the longitudinal direction with sufficient velocity so as to cause sausage 2a to land in the vicinity of cell 102a in tray 100. In some embodiments, sausage links 2a, 2b, 2c may be connected by links. In other embodiments, sausage links 2a, 2b, 2c may be separate from one another. The calibration and selection of the appropriate speed for launching sausages 2a, 2b, 2c into the cells 102a, 102b and 102c of tray 100 will depend on the particular configuration of a given system, but can be calibrated. In some embodiments, a linear speed of 200 feet per minute plus or minus 25 feet per minute has been found to be suitable for cocktail sausages, particularly in the case of a target packaging rate of 40 packages per minute. It will be appreciated that the speeds and distances involved will vary with different shapes and sizes of sausages, as well as the different possible target packaging rates which may be suitable for a particular system, tray and size of sausage.

In embodiments in which sausage links are connected, the linkage between individual sausages may facilitate the subsequent landing of sausage 2b into cell 102b after sausage 2a has landed substantially in cell 102a. Likewise, the position of sausages 2a and 2b in cells 102a and 102b, respectively, may facilitate the landing of sausage 2c into cell 102c.

In embodiments in which sausages are not linked, the presence of sausage 2a in cell 102a may still provide a degree of facilitation of placing sausage 2b into cell 102b, since sausage 2b may bump into sausage 2a while being projected from sausage conveyor 906.

Figure 9B:
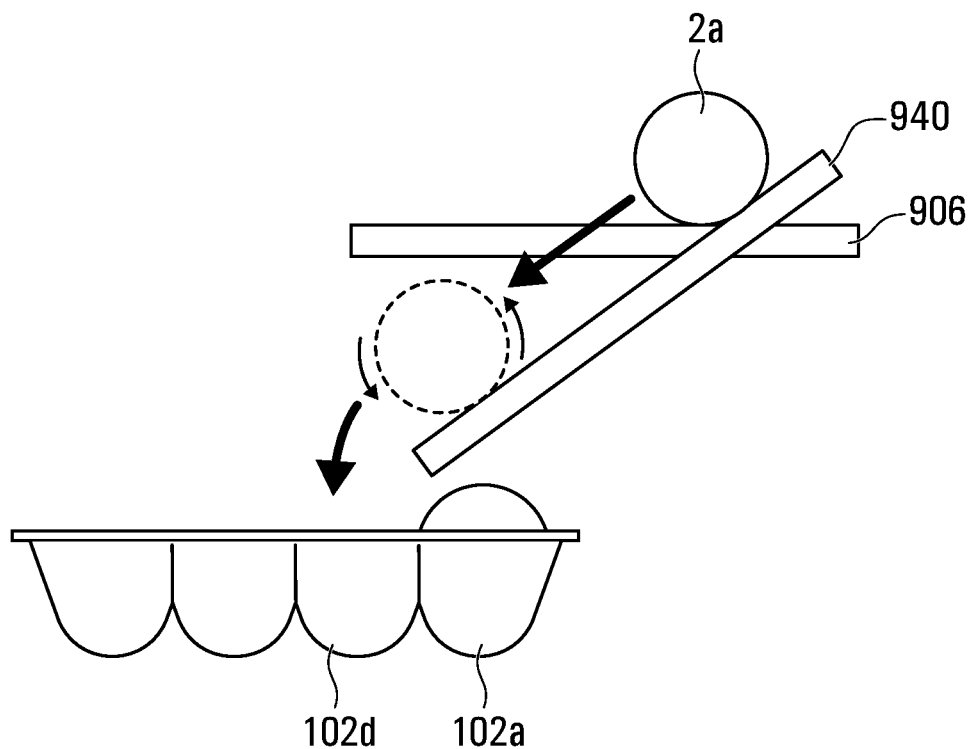
FIG. 9B is a diagram depicting an alternative embodiment of an example process for loading a tray with sausages.

In some embodiments, an angled platform 940 (as shown in FIG. 9B) may be positioned adjacent to sausage conveyor 906 and above tray conveyor 908. In such embodiments, sausage links 2a, 2b, 2c, when projected from sausage conveyor 906, may impact the angled platform, which may cause a number of resulting effects. One effect is that some of the kinetic energy of the propelled sausages may be converted to rotational kinetic energy (e.g. a spiral motion), which may facilitate the sausages falling into place within cells 102a, 102b, 102c. Another effect is that the speed of propelled sausages in the longitudinal direction may be reduced upon impact with the angled platform, which may render the likelihood lower that sausages may knock the tray off of tray conveyor 908.

Figure 9C:
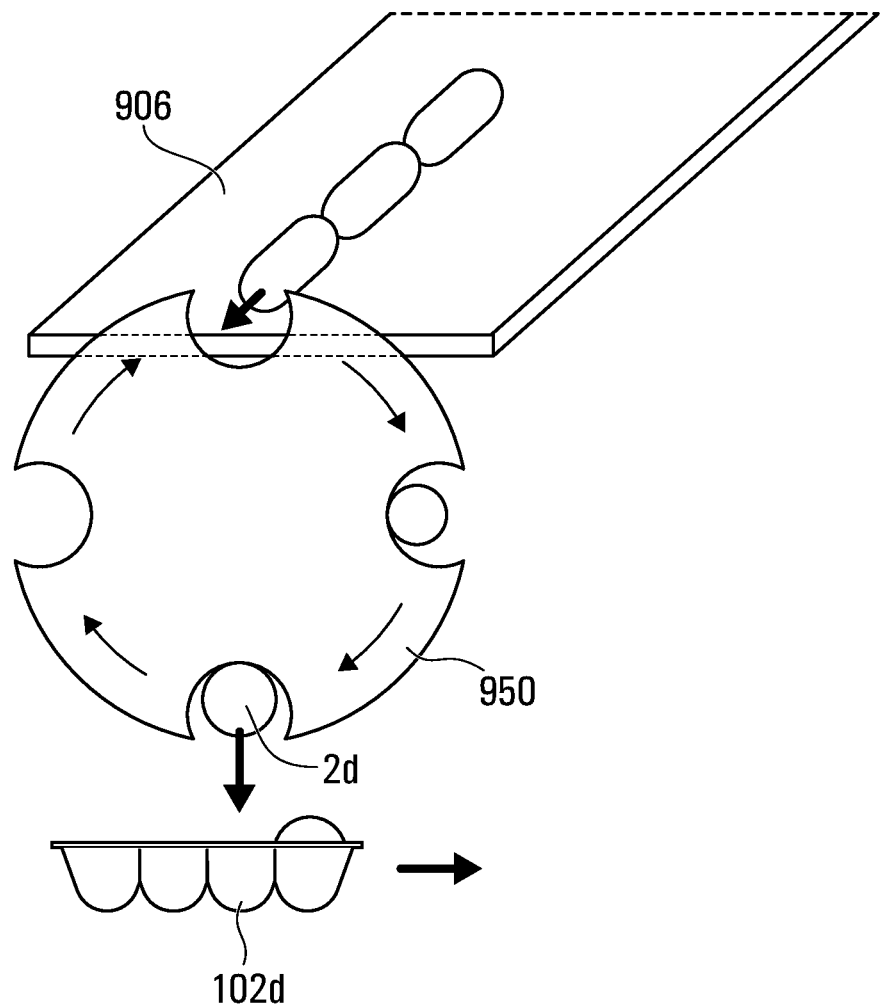
FIG. 9C is a diagram depicting an alternative embodiment of an example process for loading a tray with sausages.

In some embodiments, sausage links 2a, 2b, 2c may be loaded into a rotating loading apparatus 950 (as shown in FIG. 9C). As depicted, the holding apparatus 950 may sufficient length to allow the sausage to enter a cell, and then holding apparatus is rotated (as depicted by the arrows in FIG. 9C), which causes the sausage links to fall into a cell vertically. In some embodiments, the rotation of holding apparatus 950 occurs in discrete steps—that is, the holding apparatus 950 is stationary for a period of time prior to and after rotation. In other embodiments, holding apparatus 950 may be in constant rotation, with the movement of the sausages from tray 906 being synchronized with the rotation of holding apparatus 950 to allow links to enter into cavities in holding apparatus 950. As depicted, holding apparatus 950 has 4 cavities which may accept sausage links. In other embodiments, holding apparatus 950 may have less than 4 cavities or more than 4 cavities.

After sausages 2a, 2b and 2c have landed substantially in cells 102a, 102b and 102c, tray conveyor 908 may be actuated to move tray 100 laterally in direction B. Preferably, the tray 100 is moved by a distance substantially similar to the width of cells 102a, 102b, and 102c. Thus, the next set of sausage links 2d, 2e, 2f will be propelled by the sausage conveyor 906 into the next column of cells 102d, 102e, 102f.

In some embodiments, the duty cycle or speed at which tray conveyor 908 moves tray 100 is determined in part by a sensing device 902. The sensing device 902 may, for example, detect the presence of sausages or a particular number of sausages, and communicate this sensing data to processor 904. Processor 904 may in turn send a signal to the motor driving tray conveyor 908 to move at a certain speed or to adjust a duty cycle so as to ensure synchronization between the incoming sausage links from sausage conveyor 906 and open cells 102 in tray 100.

In some embodiments, sensing device 902 may be an optical sensor. For example, the optical sensor may send a first signal when no sausages are visible, and send a second signal when sausages are detected. The length of time between first and second signals may be used to determine an appropriate speed or duty cycle for tray conveyor 908 in order for tray 100 to receive the incoming sausages.

It will be appreciated that sausages do not have identical shapes and that some variation will be present. As such, sausages may not fall perfectly into cells 102a, 102b, 102c. It has been found that if a duty cycle is used for tray conveyor 908, the jerking motion during tray movement may assist with causing the sausages to fall into the correct cell. Because the cells 102a, 102b and 102c are shaped to substantially match the shape of sausages 2a, 2b, 2c, and because the tray 100 includes ribs 106, a sausage which does not land perfectly within a particular cell may fall into place after the pulse of lateral movement provided by the tray conveyor 908 when the tray is moved to the next position.

This may provide substantial advantages over prior systems, which required either the manual placement of sausages into a tray, or the use of robotic arms to detect and place sausages in a certain manner. It will be appreciated that building and customizing a robotic system is prohibitively expensive and impractical for most circumstances. Moreover, it will be appreciated that reducing the cost of labour associated with having employees manually place sausages into a tray would be advantageous for a business. For example, rather than having 6 employees manually placing sausages into trays, the system of FIG. 9A may instead be sufficient to function with 1 employee for quality control (in the event that a sausage fails to fall into a cell perfectly, after the pulse from conveyor tray 908).

Moreover, in some embodiments, the systems and methods described herein may improve throughput (e.g. number of packages per minute), improve efficiency (e.g. less usage of space, materials, manual labour, line time, storage, and the like), and reduce dependency on specialized materials, trades, and other risks. Without the need to pre-freeze prior to packaging, sausages are only required to be handled a single time (rather than being handled prior to freezing, and then again subsequently during packaging). In some embodiments, the production time for a tray and meat package may be reduced by up to 50% relative to previously known methods, and allows producers to respond more dynamically to customer demand with greater flexibility in the demand cycle.

Moreover, some embodiments of the systems and methods described herein may improve the flexibility and sales per square foot of a production facility by enabling a producer to package both fresh and frozen products on one line. For example, all products can be packaged as fresh products, and then a subset of those fresh packaged intended to be sold as frozen products may then be frozen. Conversely, at the present time a separate manufacturing line would be required in order to package some items fresh while pre-freezing other items prior to packaging. Some embodiments may in turn reduce the manufacturing and production costs, which may in turn lower the costs of soft retail items to the end consumer. Additionally, having the ability to sell the same package regardless of whether the sausages are fresh or frozen significantly improves flexibility, time to market, lead times, as well as costs associated with stocking separate items or completing packaging changeovers during batch runs.

Thus, the systems and methods described herein provide for numerous improvements in efficiency and many advantages over conventional tray systems.

Figure 10C:
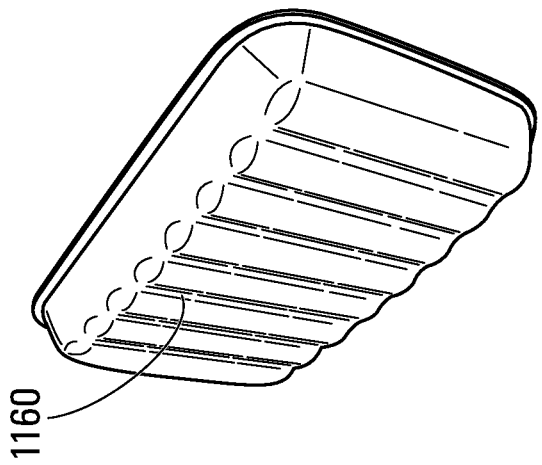
FIGS. 10A, 10B and 10C are views of an alternative embodiment of a tray for sausages.
Figure 10B:
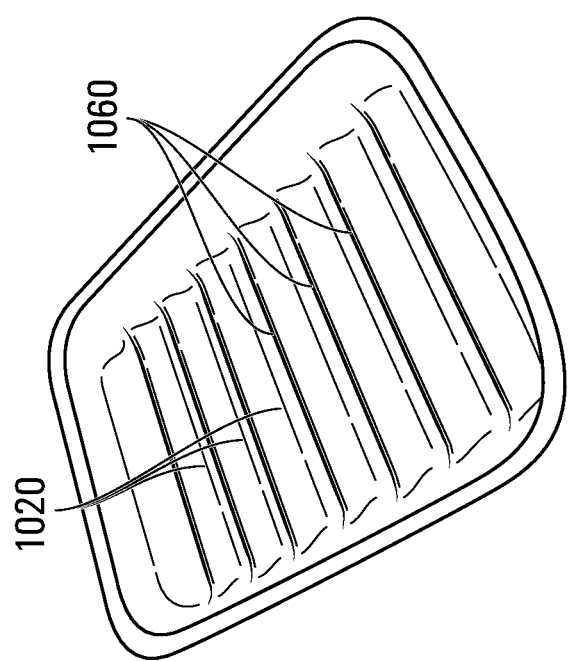
Figure 10A:
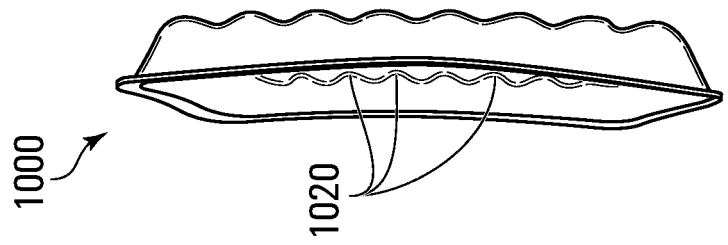

In addition, further embodiments are contemplated, in particular for different shapes of sausages. For example, FIGS. 10A and 10B are side and perspective views of a tray 1000 which is adapted to receive longer, narrower sausage (for example, hot dogs). The cells 1020 are configured to receive hot dogs and the ribs 1060 provide similar structural and functional benefits as ribs 106 described above. FIG. 10C is a perspective view of the underside of tray 1000, illustrating the corresponding shape of rib grooves 1160 to ribs 1060. Tray 1000 may be loaded with fresh sausages in a manner similar to tray 100 described above, and may be vacuum sealed in a manner similar to that which is described above.

Figure 11B:
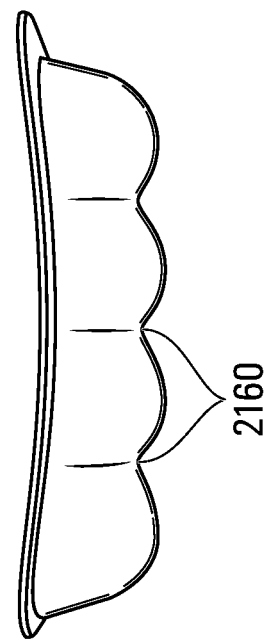
FIGS. 11A and 11B are views of an alternative embodiment of a tray for sausages.
Figure 11A:
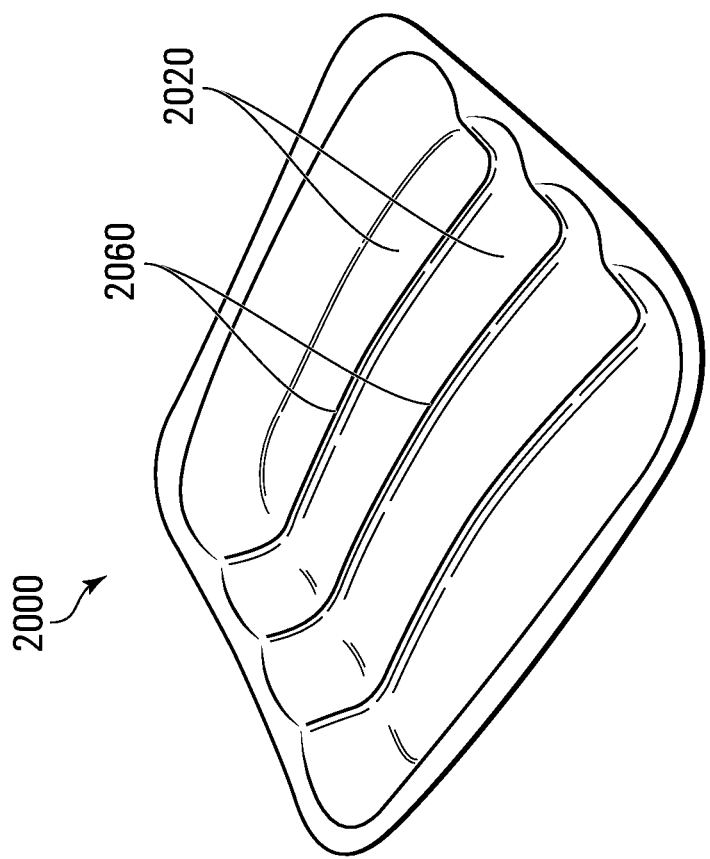
Figure 12B:
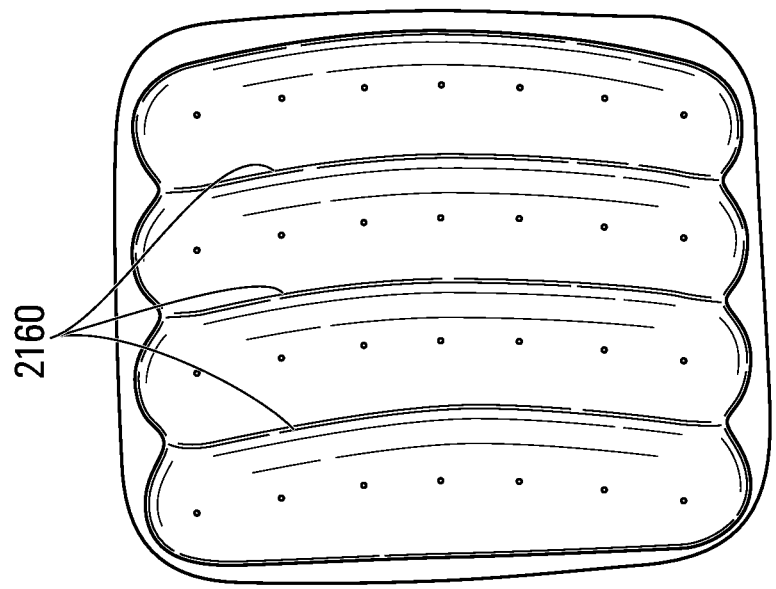
FIGS. 12A and 12B are views of the alternative embodiment depicted in FIGS. 11A and 11B.
Figure 12A:
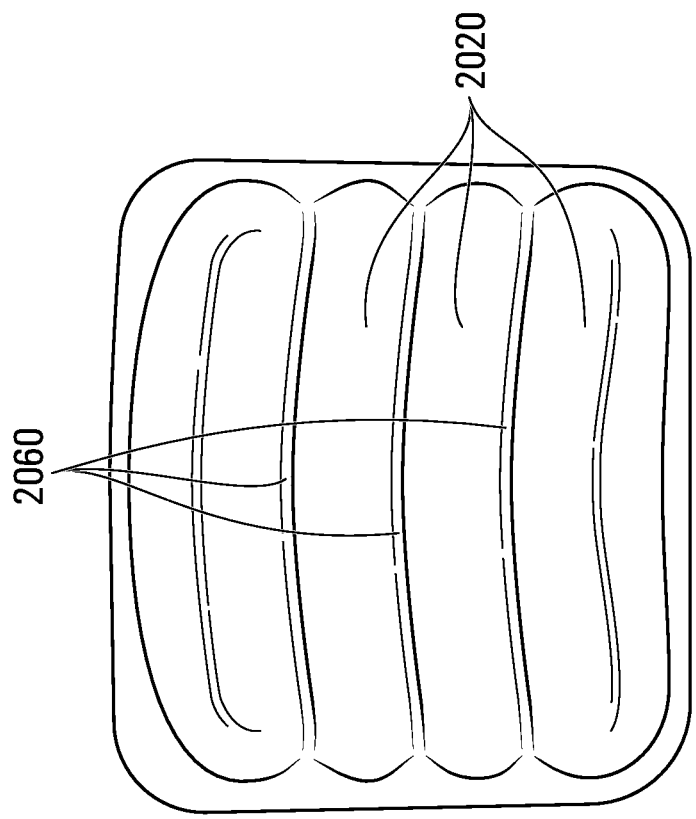

FIGS. 11A and 11B are perspective and side views of a tray 2000 which is adapted to received curved sausages. The cells 2020 are configured to receive the curved sausages and the ribs 2060 provide similar structural and functional benefits as ribs 106 and 1060 described above, with additional curvature, in that the sausages may be guided into cells 2020 and be helped in maintaining their shape by cells 2020 having a shape substantially similar to a portion of the sausage being received. Although not shown, embodiments are also contemplated for cells for sausages with similar dimensions to tray 2000 but without the curvature. Tray 2000 is also stackable, as the rib grooves 2160 are complementary in shape to ribs 2060.

Figure 13:
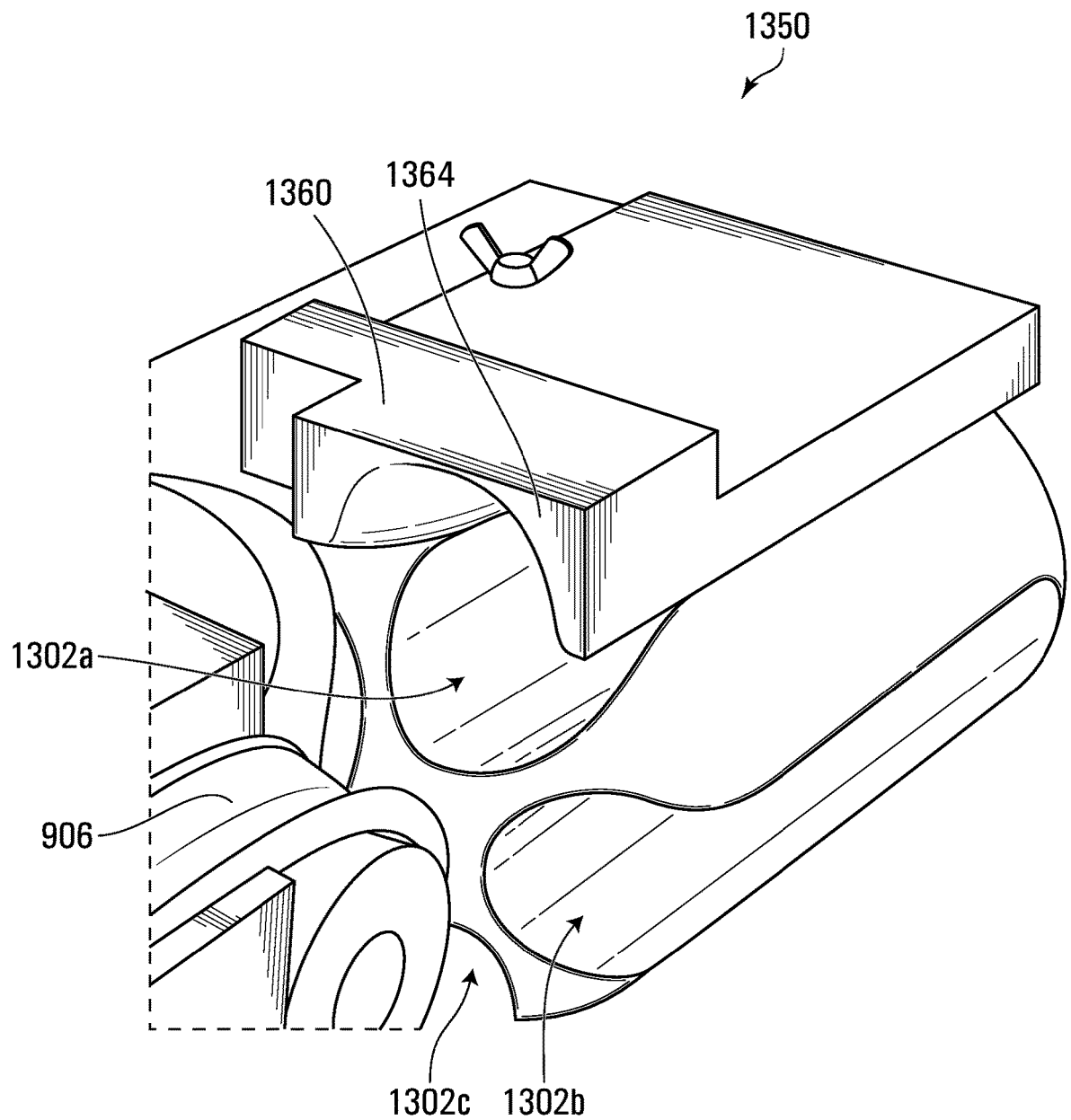
FIG. 13 is a perspective view of an example rotating loading apparatus in accordance with some embodiments.

FIG. 13 is a perspective view of an example rotating loading apparatus 1350 in accordance with some embodiments. As shown, loading apparatus 1350 includes a plurality of barrels 1302a, 1302b which are adapted to receive curved sausages. In some embodiments, loading apparatus 1350 may be used in conjunction with tray 2000 for loading curved sausages into tray 2000 in a fast and expeditious manner. As depicted in the cross-sectional view in the lower right corner of FIG. 13, loading apparatus 1350 includes 5 barrels 1302 in which sausages may be inserted. In some embodiments, loading apparatus may include more than 5 barrels or less than 5 barrels.

As depicted, in some embodiments, barrels 1302 may have a distorted or oblique cylindrical shape. That is, barrels 1302 may follow a curved path in the longitudinal direction. In some embodiments, the curved path may be suitable for accommodating a curved sausage.

In operation, lid 1360 may be placed or secured vertically above loading apparatus 1350. In some embodiments, lid 1360 may include a barrel complementary in shape to the barrels 1302 on loading apparatus 1350. In some embodiments, barrel 1302a may be aligned with the barrel of lid 1360 so as to provide a finite space in which curved sausages from sausage line 906 may be propelled. In some embodiments, there may be a back wall at the end of the barrel on the far side of the sausage line 906, which may prevent the curved sausage from being propelled through the front end of barrel 1302a and out the back side of barrel 1302a if the speed of the curved sausage is too fast.

In some embodiments, the curvature of barrel 1302a and the barrel of the lid 1364 are configured as to force a propelled curved sausage to land in only one possible orientation. For example, the curvature within the barrel 1302 may serve to guide the propelled curved sausage along the contours of the barrel 1302 so as to cause the curved sausage to settle in the curved barrel in the same orientation as the barrel 1302.

In operation, loading apparatus 1350 may be rotated. In some embodiments, the rotation may take place in discrete steps. In some embodiments, the rotation may be continuous and synchronized with the movement of the curved sausages along the sausage conveyor 906. In the case of discrete rotations, the angular displacement of the rotation may be related to the number of barrels 1302 on loading apparatus 1350. For example, in the case of 5 barrels 1302, each rotation may be by about 72 degrees. In the case of 4 barrels 1302, each rotation may be by about 90 degrees. In general, the extent of rotation may be determined by dividing 360 degrees by the number of barrels 1302 on the loading apparatus 1350.

As with the system in FIG. 9C, tray 2000 may be positioned vertically below loading apparatus 1350. In some embodiments, when rotation results in a barrel being in the lowest vertical position (denoted by barrel 1302c in FIG. 13), gravity acts on the sausage in barrel 1302c, causing the sausage to drop vertically from barrel 1302c. Because the contouring and shaping of each barrel 1302 causes a curved sausage to assume a prescribed orientation in barrel 1302, the dispensing of the curved sausage from barrel 1302c may follow a predictable and reliable path. In combination with ribs 2060 of tray 2000 (which are contoured to substantially match the shape of a curved sausage), the curved sausage may reliably descend into a cell 2020 of tray 2000. In some embodiments, the curvature of ribs 2060 facilitates guiding the curved sausage properly into a given cell.

Figure 14:
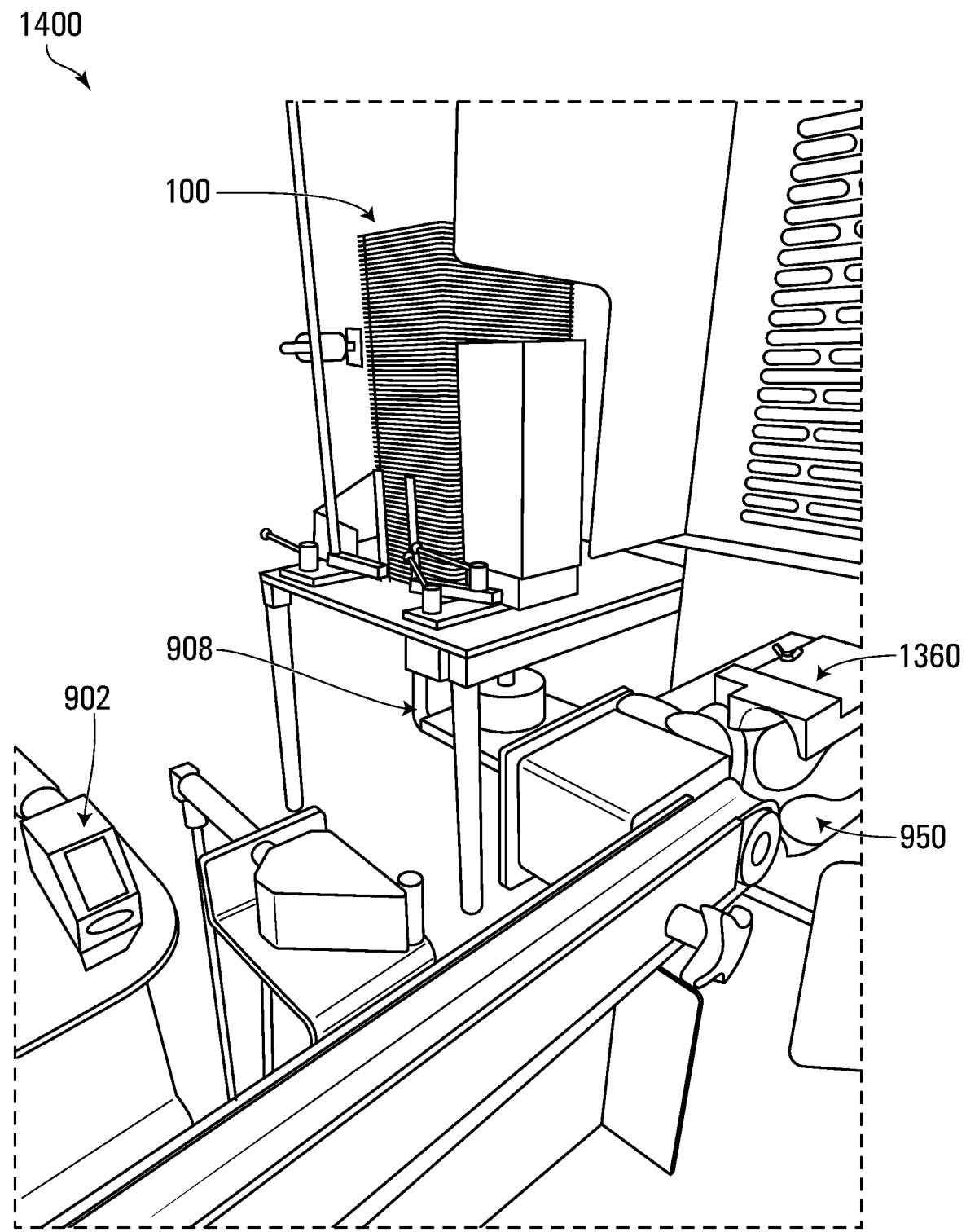
FIG. 14 is a depiction of an example system for dispensing fresh meat articles into a tray in accordance with some embodiments.

FIG. 14 is a depiction of an example system 1400 for dispensing fresh meat articles into a tray in accordance with some embodiments. As depicted, system 1400 includes sausage conveyor 906, tray conveyor 908, a plurality of trays 100, loading apparatus 950, sensing device 902, and lid 1360. Although system 1400 depicts the use of loading apparatus 950 and tray 100, it is contemplated that system 1400 may include other loading apparatus configurations (such as loading apparatus 1350) and other tray configurations (such as tray 2000). Although not illustrated, one or more of the aforementioned components may be controlled by a processor 904 (e.g. a Programmable Logic Controller).

Figure 15:
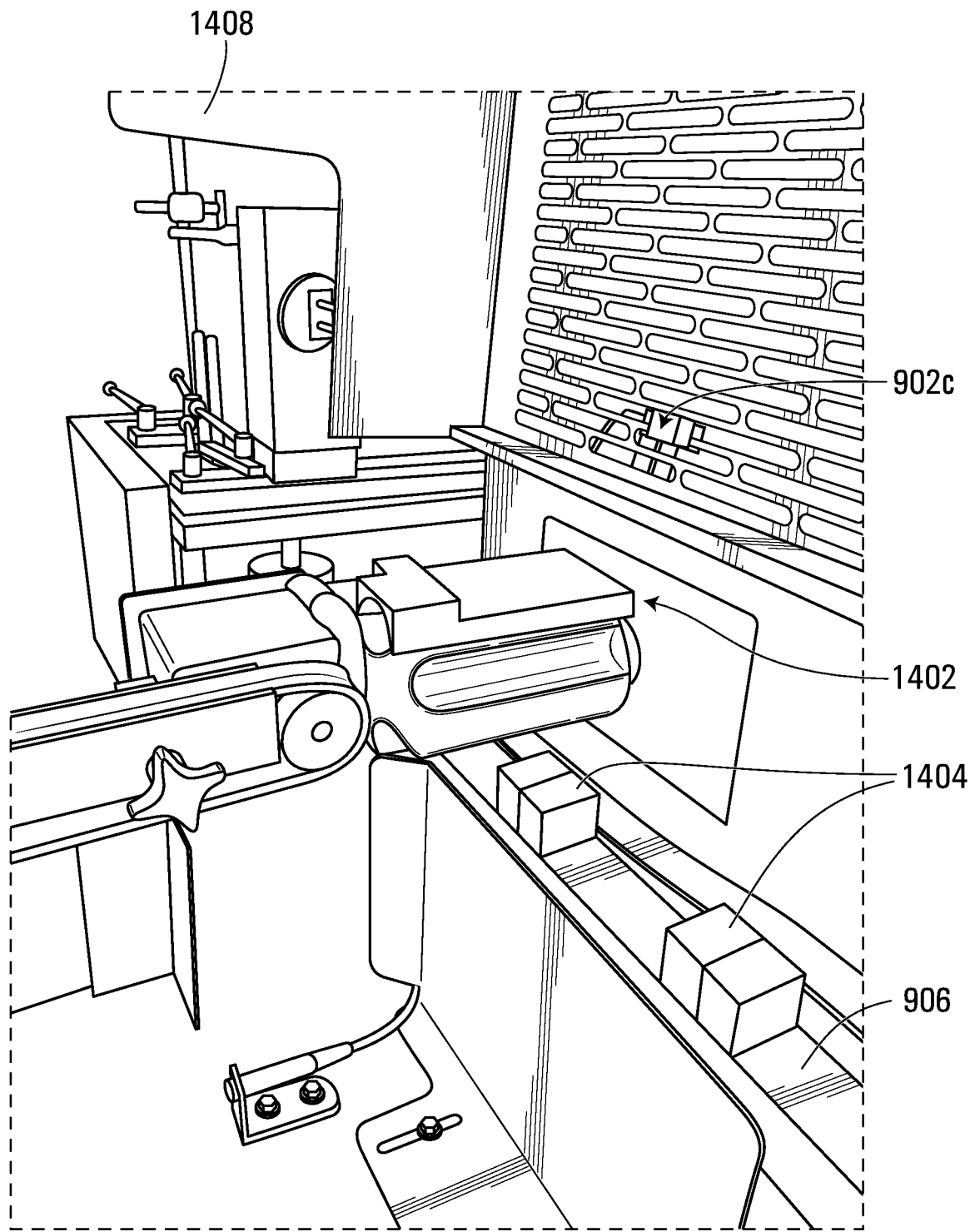
FIG. 15 is a depiction of the system of FIG. 14 with an enclosure removed.

In operation, sausages may be conveyed along sausage conveyor 906 at a given speed and propelled into a barrel of loading apparatus 950. As depicted in FIG. 15, a backstop 1402 may be present adjacent to loading apparatus 950 so as to prevent fresh meat articles from exiting the far end of loading apparatus 950. Upon loading a barrel with one or more sausages, loading apparatus 950 is rotated.

System 1400 further includes a cage 1408, which has been rotated and lifted in FIG. 15 for convenience in viewing internal components. In some embodiments, sensor 902c is included on cage 1408. In some embodiments, sensor 902c is a photoeye sensor connected to processor 904. In some embodiments, sensor 902c is positioned in a location other than cage 1408. In operation, sensor 902c is configured to detect that a sausage (or links of sausages, as the case may be) has entered the barrel of loading apparatus 950 and hit back wall 1402. In some embodiments, the output of sensor 902c is used by processor 904 to determine that the barrel has been loaded, and to trigger various movements in system 1400. For example, such movements may include one or more of rotating loading apparatus 950, moving tray conveyor 908 by a predetermined distance, and releasing a new tray from the stack of trays 100 to be deposited onto tray conveyor 908.

Figure 16:
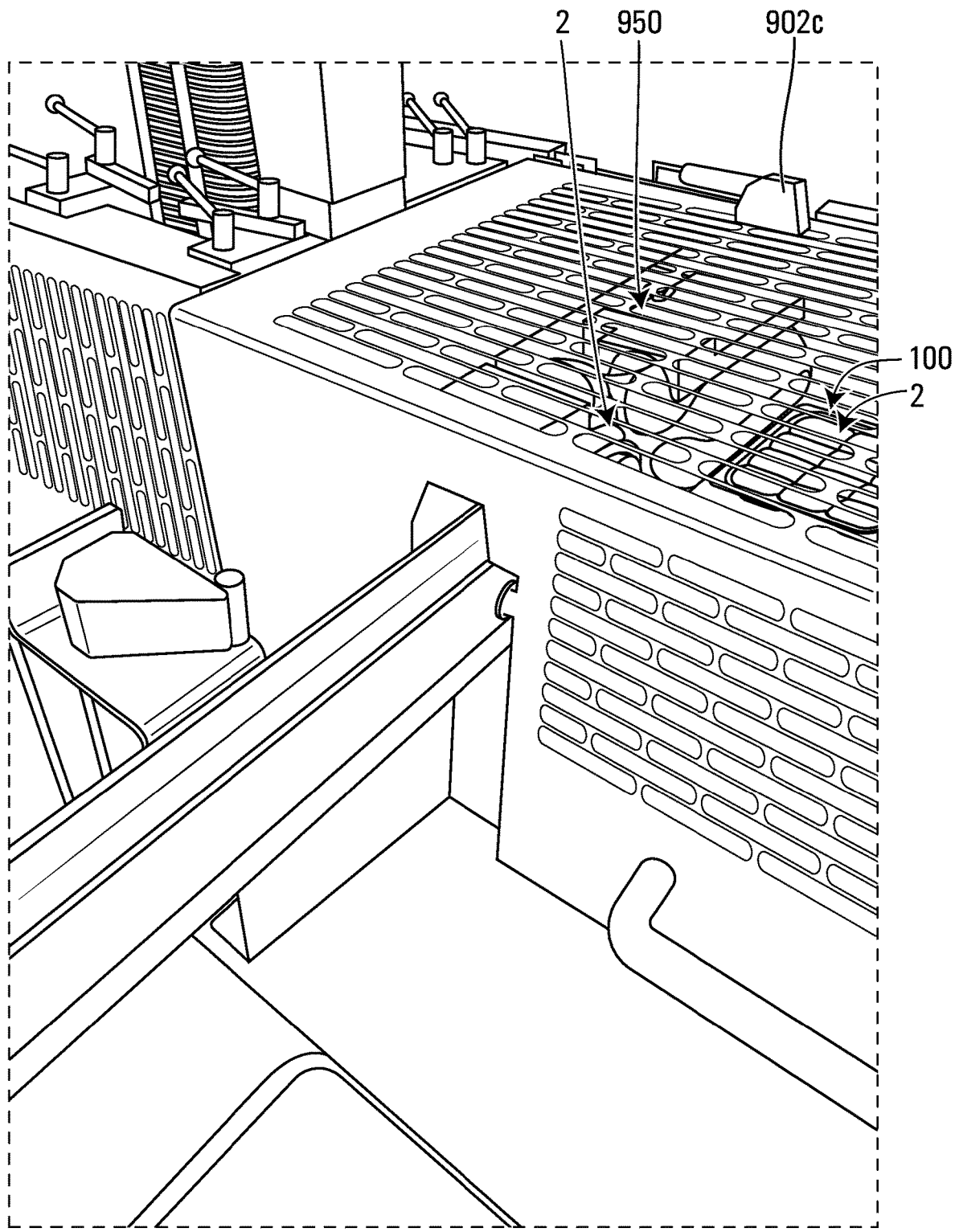
FIG. 16 is a depiction of fresh meat articles entering the barrel of a loading apparatus.

FIG. 16 is a depiction of system 1400 with cage 1408 having been shut. Cage 1408 may serve to enhance safety of system 1400 during operation by preventing users' hands and/or clothing from getting in close proximity with moving parts, potentially resulting in injury. As shown in FIG. 16, sensor 902c is positioned roughly vertically above the back side (that is, the side furthest away from sausage conveyor 906) of loading apparatus 950. Thus, sensor 902c may be configured to sense the presence of sausages 2 in the barrel being loaded, and/or the presence of any portion of a sausage in close proximity to backstop 1402. FIG. 16 further depicts a loaded tray 100, which has been moved along tray conveyor 908 after being loaded.

Referring again to FIG. 15, tray conveyor 908 may include one or more blocks 1404. In some embodiments, blocks 1404 may be spaced apart by a sufficient distance to allow a tray 100 to be inserted between blocks 1404. In some embodiments, the distance between blocks 1404 may be selected so as to substantially match a dimension of tray 100. During operation, processor 904 may cause a motor to advance tray conveyor 908 (thereby advancing any trays 100 which are present between blocks 1404) after sausage(s) 2 have been dispensed into cells of tray 100. In some embodiments, tray conveyor 908 is advanced by a distance substantially equal to a width of a cell on tray 100. That is, the tray conveyor 908 advances to move a full row of cells of tray 100, resulting in a new empty row of cells being positioned vertically below loading apparatus 950, ready to receive the next row of sausages 2.

In some embodiments, processor 904 may be programmed to maintain a count of the number of rows filled. For example, if tray 100 has 4 rows (each row having 3 cells), then processor 904 may determine that, after incrementing the position of the conveyor 4 times, tray 100 is full, and may cause a greater displacement of tray conveyor 908.

In some embodiments, the greater displacement amount may be, for example, based on a dimension of block 1404, so as to position a first empty row of cells of a new empty tray 100 vertically beneath loading apparatus 950 for subsequent loading with sausages 2 or other fresh meat articles.

Figure 17:
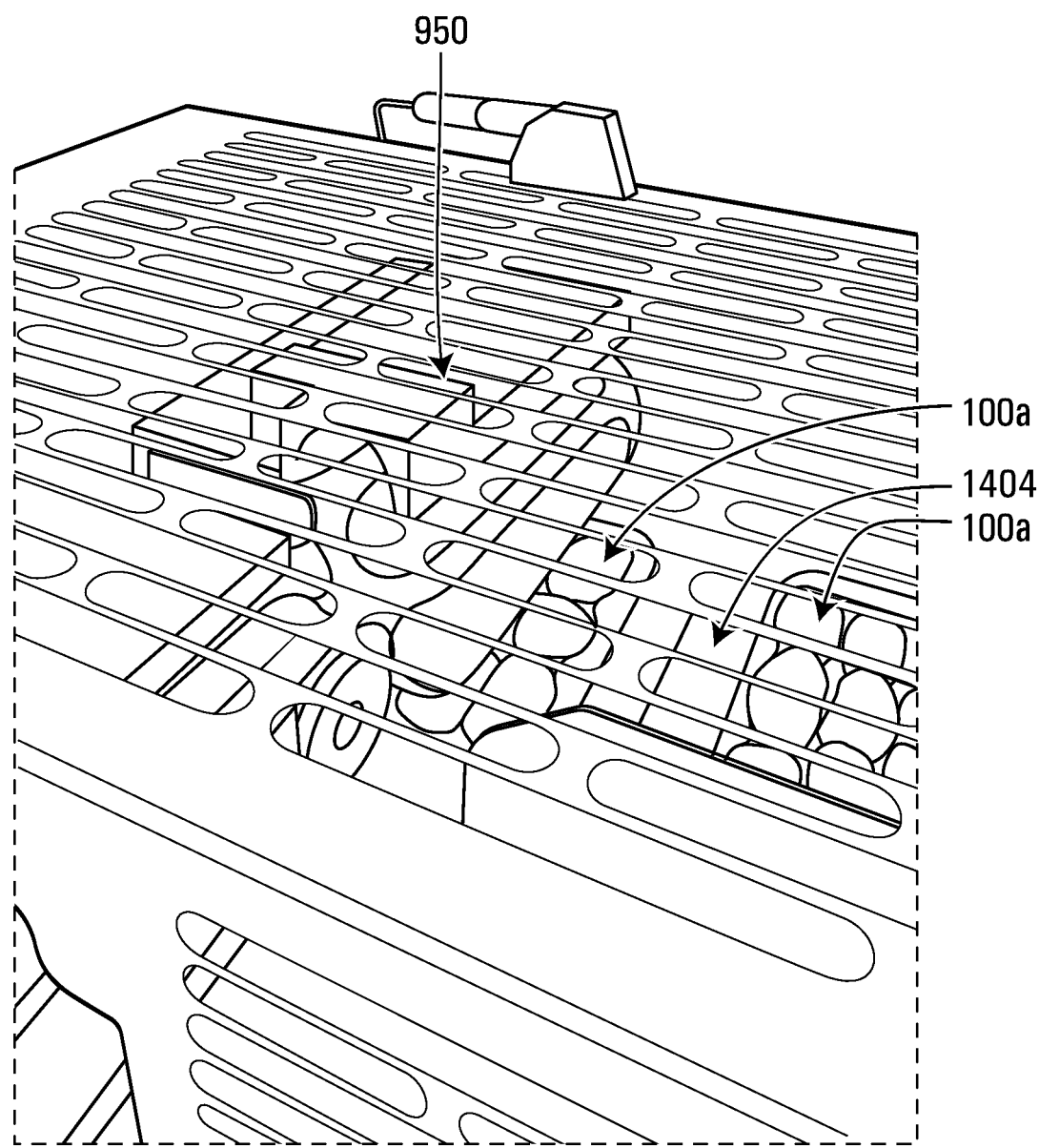
FIG. 17 is a depiction of a plurality of trays in the system of FIG. 14.

FIG. 17 provides a closer view of a fully loaded tray 100a and a partially loaded tray 100b still being loaded vertically below loading apparatus 950, and separated by blocks 1404. In some embodiments, blocks 1404 may serve to secure trays 100 and prevent slippage during potentially jerky movement along tray conveyor 908. This added stability may in turn enhance the system's reliability by ensuring that sausages 2 loaded into recessed cells of tray 100 are less likely to come loose during jerky motion and fall into a different row of cells.

Figure 18:
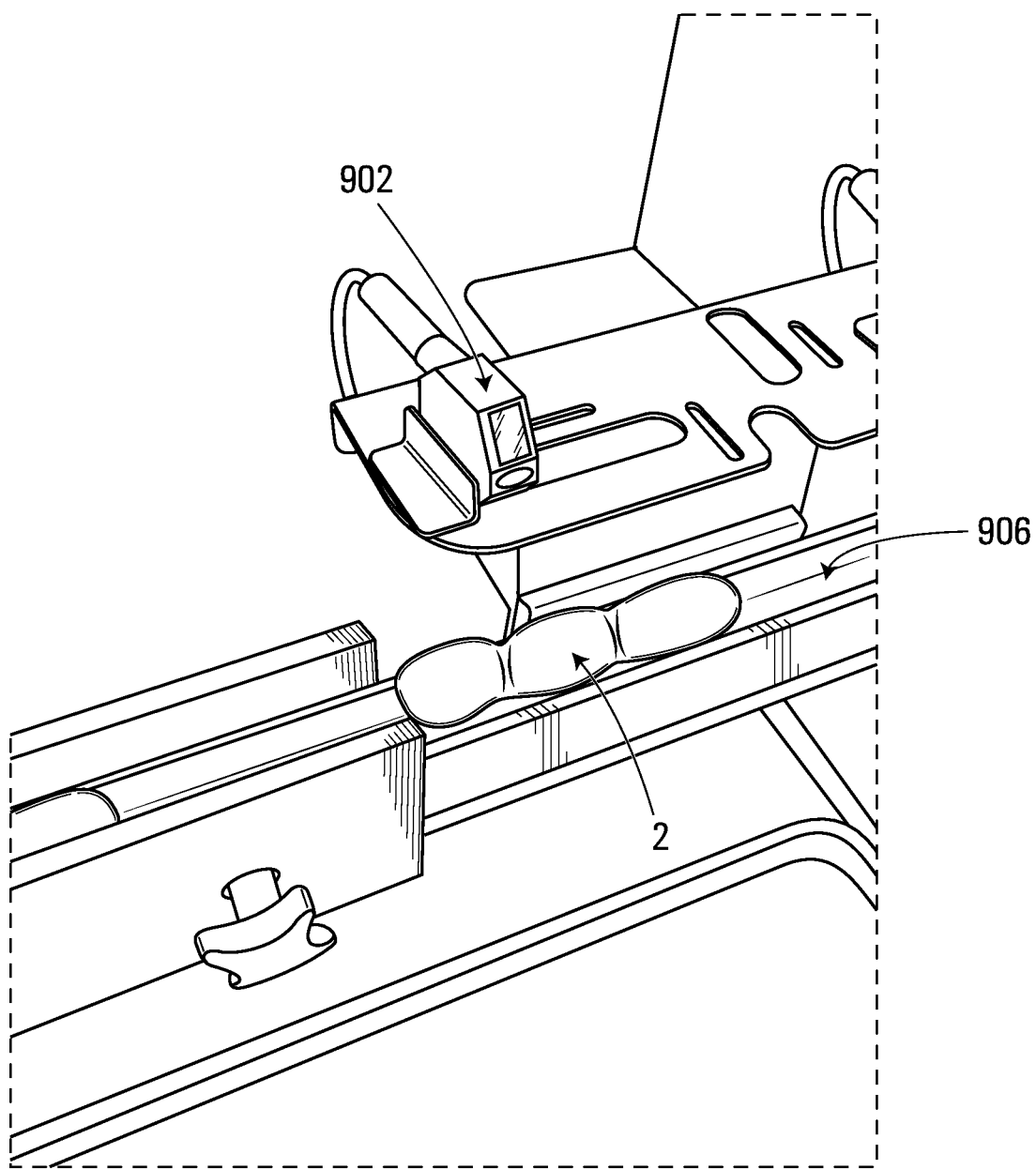
FIG. 18 is a depiction of the operation of a sensor in accordance with some embodiments.

FIG. 18 depicts the operation of a sensing device 902 along sausage conveyor 906. As depicted, three sausage links 2 are being propelled along sausage conveyor 906. The sausage vertically beneath sensor 902 can be seen to be visibly lit by a light emanating from sensor 902. In some embodiments, sensor 902 is a photoeye sensor which measures a distance from an object. Therefore, as the three sausage links travel along sausage conveyor 906, the data collected from sensor 902 may be used by processor 904 to confirm that the correct length or sausage or amount of sausage links has travelling along sausage conveyor 906. For example, three linked sausages would be expected to feature two brief increases in recorded distance from sensor 902 as the two links between the three sausages 2 pass by.

Figure 19:
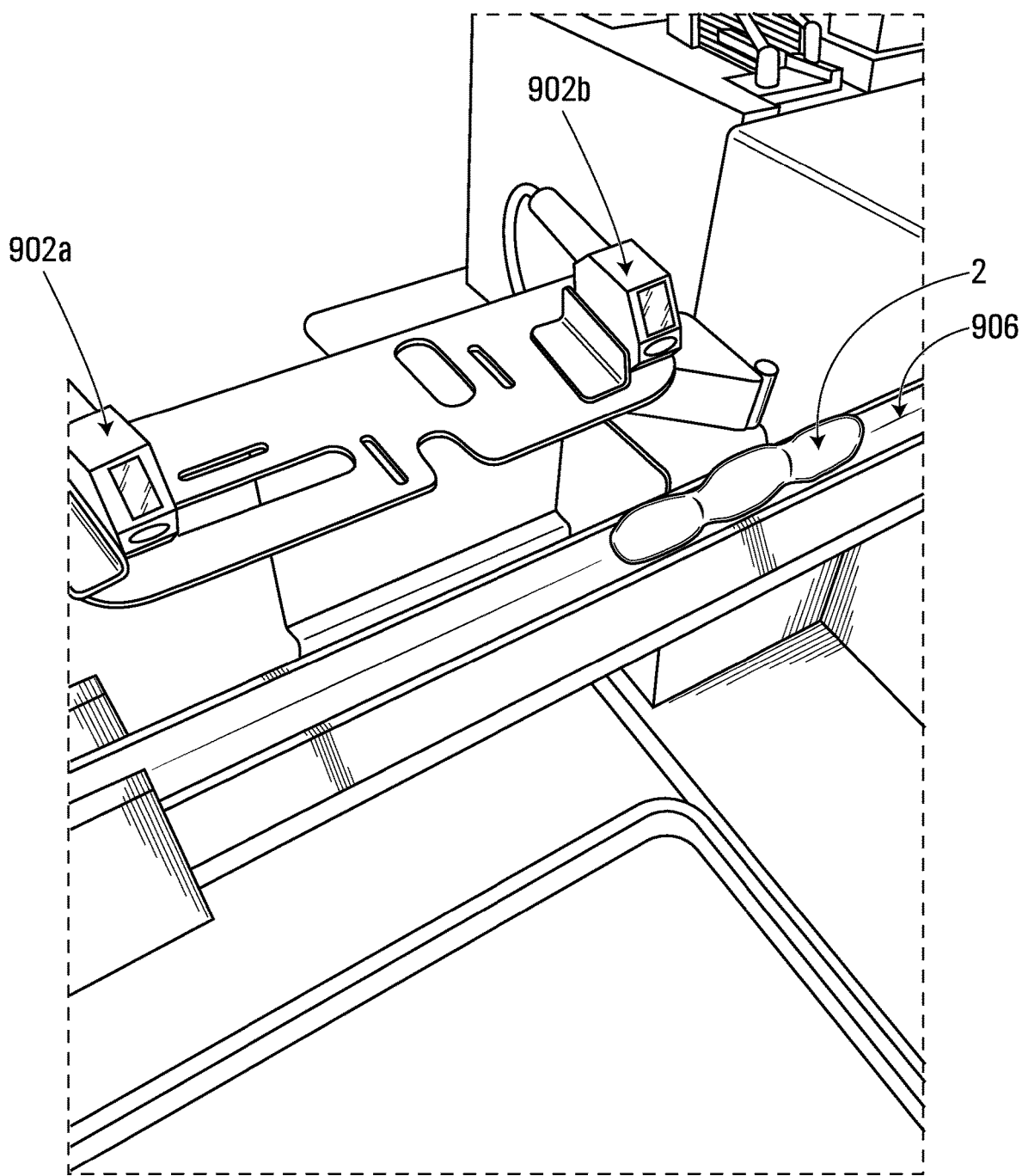
FIG. 19 is a depiction of an example multi-sensor system.

In some embodiments, sausage conveyor 906 may include two sensors 902a, 902b. FIG. 19 depicts the operation of a pair of sensing devices 902a, 902b. As depicted, there are no sausages vertically beneath sensor 902a, and a sausage is present beneath sensor 902b. Sensor 902b may be located closer to loading apparatus 950 than sensor 902a. The outputs of sensors 902a, 902b may be used by processor 904 to determine one or more of: whether the length of sausage links is correct, whether the number of sausage links is correct (thereby identifying broken sausage links or links which have fallen out of alignment along sausage conveyor 906).

In some embodiments, if processor 904 determines that a length of sausage is incorrect, or a sausage is improperly aligned or has fallen off sausage conveyor 906, processor 904 may cause a motor powering sausage conveyor 906 to stop. This may enhance reliability and efficiency of system 1400, as events which may potentially result in blockages or compounding errors and meat products falling off conveyor line may be prevented or reduced.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A method of loading a tray with fresh meat articles, the method comprising:
    displacing, on a first conveyor line, at least one fresh meat article towards a tray having a plurality of cells for receiving the at least one fresh meat article, the tray sitting on a second conveyor line oriented at an angle relative to a direction of travel of the at least one fresh meat article;
    detecting, by a sensing device, presence of the at least one fresh meat article on the first conveyor line;

arranging said tray below said at least one fresh meat article on said second conveyor line;

conveying said at least one fresh meat article into one or more of said plurality of cells; and displacing, by the second conveyor line, the tray by an increment, wherein a processor maintains a count of said increment, and wherein said processor is configured to cause dispensing of another tray onto said second conveyor line after said count reaches a predetermined threshold.

2. The method of claim 1, wherein the increment corresponds to a width of the at least one fresh meat article.

3. The method of claim 1, wherein the displacing of the at least one fresh meat article comprises displacing at least two fresh meat articles in succession into said tray.

4. The method of claim 1, wherein said at least one fresh meat article lands into one of said plurality of cells in a first orientation having a first stability.

5. The method of claim 4, wherein the displacing, by the second conveyor line, of the tray by said increment causes said at least one fresh meat article to move to a second orientation in said one of said plurality of cells, said second orientation having a second stability greater than said first stability.

6. The method of claim 1, wherein the at least one fresh meat article comprises a plurality of fresh meat articles connected by links.

7. The method of claim 1, further comprising vacuum sealing the tray, said vacuum sealing including partially deforming at least a portion of said at least one fresh meat article.

8. The method of claim 1, wherein said conveying of said at least one fresh meat article comprises loading a barrel of a loading apparatus with said at least one fresh meat article.

9. The method of claim 8, wherein said conveying further comprises rotating said loading apparatus by a rotational increment to effect conveyance of said at least one fresh meat article into said one or more of said plurality of cells.

10. The method of claim 8, wherein said loading apparatus comprises a plurality of barrels.

11. The method of claim 8, wherein said barrel is cylindrical in shape.

12. The method of claim 8, wherein said barrel has a curved cylindrical shape complementary to a shape of said at least one fresh meat article.

13. The method of claim 1, wherein the angle is 90 degrees.

14. The method of claim 1, wherein the angle is 0 degrees.

15. The method of claim 9, further comprising: prior to rotating said loading apparatus, detecting, via a sensor, that said at least one fresh meat article has entered said barrel.

* * * * *